United States Patent [19]

Doré et al.

[11] Patent Number: 4,670,546

[45] Date of Patent: Jun. 2, 1987

[54] DISAZO AND POLYAZO COMPOUNDS CONTAINING AT LEAST TWO CATIONIC GROUPS IN METAL-FREE OR 1:1 OR 1:2 METAL COMPLEX FORM

[75] Inventors: Jacky Doré, Basel; Reinhard Pedrazzi, Allschwil, both of Switzerland

[73] Assignee: Sandoz Ltd., Basel, Switzerland

[21] Appl. No.: 625,716

[22] Filed: Jun. 28, 1984

Related U.S. Application Data

[63] Continuation-in-part of Ser. No. 488,136, Apr. 25, 1983, abandoned.

[30] Foreign Application Priority Data

Apr. 24, 1982 [DE] Fed. Rep. of Germany ....... 3215361
Feb. 5, 1983 [DE] Fed. Rep. of Germany ....... 3303869

[51] Int. Cl.$^4$ .............. C09B 44/02; C09B 44/08; D06P 1/41; D06P 3/60
[52] U.S. Cl. ................... 534/612; 534/588; 534/589; 534/598; 534/599; 534/602; 534/605; 534/613; 534/614; 534/615; 534/643; 564/142; 564/166
[58] Field of Search ............ 260/153, 185, 174, 178, 260/186, 187, 208; 534/603, 604, 605, 612, 613, 614, 615

[56] References Cited

U.S. PATENT DOCUMENTS 2,945,849  7/1960  Kruckenberg et al. ............. 260/185
3,635,940  1/1972  Hegar et al. ........................ 260/155
4,363,761 12/1982  Pedrazzi ............................. 260/153

FOREIGN PATENT DOCUMENTS 1276317  6/1972  Fed. Rep. of Germany ...... 260/152
2338151  2/1974  Fed. Rep. of Germany ...... 260/152

Primary Examiner—Floyd D. Higel
Attorney, Agent, or Firm—Gerald D. Sharkin; Richard E. Vila; Melvyn M. Kassenoff

[57] ABSTRACT

Compounds of the formula

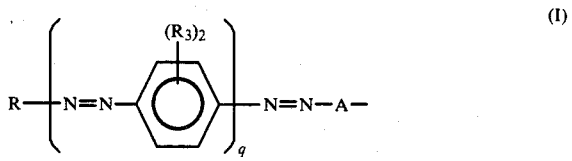

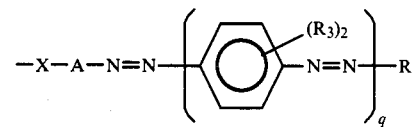

in metal-free, 1:1 or 1:2 metal complex form, or in acid addition salt form, where the symbols are defined in the specification, useful as dyes for, for example, regenerated cellulose, cotton, synthetic polyamides and polyesters modified to contain acid groups and polymers and copolymers of acrylonitrile and 1,1-dicyanoethylene.

14 Claims, No Drawings

DISAZO AND POLYAZO COMPOUNDS CONTAINING AT LEAST TWO CATIONIC GROUPS IN METAL-FREE OR 1:1 OR 1:2 METAL COMPLEX FORM

This application is a continuation-in-part of application Ser. No. 06/488,136, filed Apr. 25, 1983 and now abandoned.

The invention relates to azo compounds for use as dyestuffs, which compounds contain at least two cationic groups.

The invention provides compounds of formula I

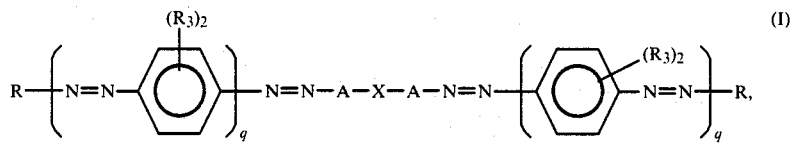

in metal-free or 1:1 or 1:2 metal complex form; which metal-free compounds and metal complexes may, when containing one or more basic (non-cationic) groups, be in free base or acid addition salt form;
where
X is

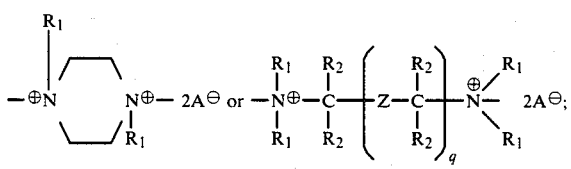

each q independently is 0 or 1;
each A, independently, is $-A_1-NHCO-A_2-$, $-A_1-NH-SO_2-A_2-$ or $-A_1-CO-NH-A_2-$;
where
each $A_1$, independently, is attached to X and is a linear or branched $C_{1-8}$alkylene group;
each $A_2$, independently, is naphthylene, phenylenea, 5- or 6-membered heterocyclic group optionally substituted by a phenylene group, which phenylene group is attached to $-NHCO$ or $-NHSO_2-$ or a group of the formula

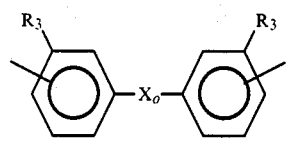

Z is a direct bond or a bridging group;
$X_0$ is a direct bond or a bridging group;
each R, indpendently, is a diazo component radical or a coupling component radical optionally containing one or more groups selected from sulpho and carboxy groups, basic groups and cationic groups;
each $R_1$, independently, is a linear or branched $C_{1-6}$-alkyl group or a linear or branched $C_{3-6}$alkenyl group;
each $R_2$, independently, is hydrogen or one of the significances of $R_1$ (independent of $R_1$);
each $R_3$, independently, is hydrogen, halogen, $-OH$, $C_{1-6}$alkyl or $C_{1-6}$alkoxy; and
each $A^\ominus$ independently is a non-chromophoric anion, with the proviso that where one or more sulpho or carboxy groups are present, the sum of the cationic and basic groups (if present) exceeds the sum of the sulpho and carboxy groups present.

Preferably the total number of cationic groups in a compound of formula I is from 2 to 10, more preferably from 2 to 8, and the total number of basic groups (when present) in a compound of formula I is 2 to 6, more preferably 2 to 4. Preferably the number of sulpho groups present is 2 to 4. Preferably the number of carboxy groups present is 0 to 2. Preferably the sum of cationic and basic groups is at least 3 and more preferably does not exceed 10.

Any alkyl, alkenyl, alkylene or alkenylene group may be linear or branched, unless indicated to the contrary. Furthermore, in the specification but not in the claims, any such group is unsubstituted or substituted by one to three substituents independently selected from halogen, cyano, hydroxy and phenyl, unless indicated to the contrary. Throughout this application any such group is preferably unsubstituted, unless indicated to the contrary.

Preferably, no hydroxy or cyano substituent on an alkyl, alkenyl, alkylene or alkenylene group or radical is on a carbon atom directly attached to a nitrogen or oxygen atom. For example, the hydroxy group of any $C_{2-4}$hydroxyalkyl group attached to a nitrogen atom is preferably in the 2-, 3- or 4-position.

Preferably any alkyl is unsubstituted methyl or ethyl and any alkoxy is unsubstituted methoxy or ethoxy unless indicated to the contrary. Preferably, any alkylene is unsubstituted methylene, ethylene or 1,2- or 1,3-propylene, and any alkenylene is unsubstituted $C_{3-6}$alkenylene unless indicated to the contrary. Preferably any alkenyl is unsubstituted $C_{3-4}$alkenyl, more preferably allyl or 3-methylallyl. Preferably, the double bond of any alkenyl group or alkenylene radical is in other than the $\alpha$-position and more preferably is in the $\beta$-position (i.e., between the second and third carbon atoms, unless indicated to the contrary.

In the specification but not in the claims, any phenyl, phenylene, naphthyl or naphthylene group or radical is unsubstituted or substituted by one to three (preferably one or two) groups selected from $C_{1-4}$alkyl, $C_{1-4}$alkoxy, acylamino (e.g. $-NHCO(C_{1-4}alkyl)$, especially $-NHCO(C_{1-2}alkyl)$) and halogen, unless indicated to the contrary. Unless indicated to the contrary, any such group is preferably unsubstituted. Preferably, any phenylene is 1,3- or 1,4-phenylene, more preferably the latter, unless indicated to the contrary, and any naphthylene is preferably 1,3-, 1,4-, 1,5-, 1,6-, 1,7-, 2,5-, 2,6-, 2,7- or 2,8-naphthylene, unless indicated to the contrary.

By halogen (or halo) is meant chlorine or bromine, preferably chlorine.

The significances of any symbol appearing more than once in a formula are independent of one another unless indicated to the contrary. Likewise, all of the preferences set forth above or below are independent of one another and apply to each occurrence of the group, radical, etc. in question independent of any other occurrence of the same group, radical, etc.

Preferred heterocyclic groups in $A_2$ are pyrazolyl substituted by phenylene attached to —NHCO— or —NHSO$_2$— or pyrimidyl. Preferably, the phenylene radical is attached to a nitrogen atom of the pyrazolyl group.

Preferably $R_1$ is $R_1'$ where each $R_1'$ independently is selected from $C_{1-4}$alkyl unsubstituted or substituted by a phenyl group and $C_{2-4}$alkyl unsubstituted or substituted by —OH, —CN or halogen. More preferably $R_1$ is —CH$_3$.

Preferably $R_2$ is $R_2'$ where each $R_2'$ independently is selected from hydrogen, unsubstituted $C_{1-4}$alkyl and $C_{1-4}$alkyl substituted by —OH, —CN or halogen. More preferably $R_2$ is —CH$_3$ or hydrogen.

Preferably $R_3$ is $R_3'$ where each $R_3'$ independently is hydrogen, —OH, methyl, ethyl, chloro, bromo, methoxy or ethoxy. More preferably each $R_3$ is $R_3''$ where each $R_3''$ is independently hydrogen, chloro, bromo, —OH, methyl or methoxy.

Preferably X is X' where X' is $$-\overset{\oplus}{\underset{R_1'}{N}}\diagup\hspace{-0.5em}\diagdown\hspace{-0.5em}\underset{R_1'}{\overset{\oplus}{N}}-\quad 2A^{\ominus}\ or$$

$$-\overset{R_1'}{\underset{R_1'}{\overset{|}{\oplus}N}}-\overset{R_2'}{\underset{R_2'}{\overset{|}{C}}}-Z'-\overset{R_2'}{\underset{R_2'}{\overset{|}{C}}}-\overset{R_1'}{\underset{R_1'}{\overset{\oplus}{N}}}-\quad 2A^{\ominus},$$

where Z' is a direct bond; —O—; —S—; —N(CH$_3$)—; a linear or branched $C_{1-10}$alkylene group or a linear or branched $C_{2-10}$alkylene group interrupted by —O—, —S— or N(CH$_3$)—; linear or branched $C_{2-10}$alkenylene, unsubstituted or substituted by $C_{1-4}$alkyl; phenylene, unsubstituted or substituted by 1 or 2 $C_{1-4}$alkyl groups; cyclohexylene, unsubstituted or substituted by a $C_{1-4}$alkyl group or a group $$-(CH)_a-X_1-(CH)_a-\\ \,\,\,\,\,\,\,\,\,\,\,\,|\,\,\,\,\,\,\,\,\,\,\,\,\,\,\,\,\,\,\,\,\,\,\,\,\,\,\,\,\,\,|\\ \,\,\,\,\,\,\,\,\,\,\,\,R_2'\,\,\,\,\,\,\,\,\,\,\,\,\,\,\,\,\,\,R_2'$$

where $X_1$ is

—NHCONH—, —NH—CO—(CH$_2$)$_a$—CO—NH—,

-continued $$-\overset{|}{\underset{R_2'-N-R_2'}{CH}}-\text{ or }-NH\diagup\hspace{-0.3em}\overset{R_5}{\underset{N}{\diagdown\hspace{-0.3em}N\hspace{-0.3em}\diagup}}\hspace{-0.3em}NH-$$

where
$R_5$ is —OH, Cl, —N($R_6$)$_2$ or —OCH$_3$,
where
each $R_6$ independently is hydrogen, $C_{1-4}$alkyl or phenyl, and
each a independently is an integer 0 to 6.

Z' is preferably other than —O—, —S— and —N(CH$_3$)- and more preferably is Z''.

More preferably X is X'' where X'' is $$-\overset{\oplus}{\underset{CH_3}{N}}\diagup\hspace{-0.5em}\diagdown\hspace{-0.5em}\underset{CH_3}{\overset{\oplus}{N}}-\quad 2A^{\ominus}\ or$$

$$-\overset{CH_3}{\underset{CH_3}{\overset{\diagup}{\oplus N}}}-CH_2-Z''-\overset{R_{20}}{\underset{|}{CH}}-\overset{CH_3}{\underset{CH_3}{\overset{\oplus}{N}\diagdown}}-\quad 2A^{\ominus}$$

where Z'' is a direct bond, $$-(CH_2)_{a_1}-,\,-\hspace{-0.3em}\underset{}{\bigcirc}\hspace{-0.3em}-,\,-CH_2-\overset{CH_3}{\underset{|}{N}}-CH_2-,$$

$$-C(CH_3)_2-,\,-\hspace{-0.3em}\underset{}{\bigcirc}\hspace{-0.3em}-\hspace{-0.3em}\underset{}{\bigcirc}\hspace{-0.3em}-,$$

$$-\hspace{-0.3em}\underset{}{\bigcirc}\hspace{-0.3em}H\hspace{-0.3em}-\text{ or }-CH=CH-,$$

where
$a_1$ is 1 or 2,
and $R_{20}$ is hydrogen or, when Z'' is —(CH$_2$)$_{a_1}$— and $a_1$ is 1, additionally —CH$_3$.

Preferably $X_o$ is a direct bond or linear or branched $C_{1-4}$alkylene.

A is preferably A' where
A' is —A$_1'$—NHCO—A$_2'$— or —A$_1'$—CONH—A$_2'$—,
where
A$_1'$ is linear or branched $C_{1-6}$alkylene and A$_2'$ is 1,4- or 1,3-phenylene having two identical or different $R_{3a}$ (preferably $R_{3a}'$, more preferably $R_{3a}''$) groups or 1,3-, 1,4-, 1,5-, 1,6-, 1,7-, 2,6- or 2,7-naphthylene, where
$R_{3a}$ is a significance of $R_3$ or —SO$_3$H;
$R_{3a}'$ is a significance of $R_3'$ or —SO$_3$H; and
$R_{3a}''$ is a significance of $R_3''$ or —SO$_3$H.

More preferably A is A'' where A'' is

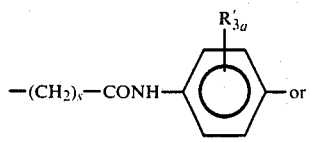

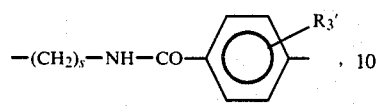

where s is 1, 2, 3 or 4.

Preferably each R is independently a coupling component radical, more preferably a naphthol group substituted by at least one sulpho group and at least one cationic and/or one basic group (preferably by at least one $R_7$ group). Most preferably, each R independently is an $R_7$-bearing naphthol group as in formula II.

Any q in X is preferably 1.

Preferred compounds of formula I are of formula II

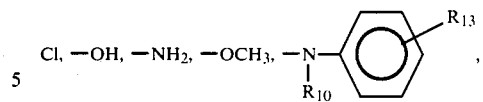

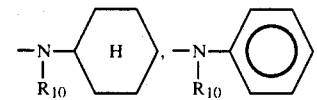

$N-C_{1-4}alkyl-N-C_{3-4}alkylamino$, $N,N$-di-$(C_{2-4}hy$-droxyalkyl)amino or $-NR_{10}R_{11}$, any hydroxy substituent preferably being in the 2-, 3- or 4-position of the alkyl group;

each $R_{10}$ independently is hydrogen, methyl or ethyl; and each $R_{11}$, independently, is linear or branched $C_{1-12}$alkyl unsubstituted or substituted by an —OH or —OCH$_2$ group, which alkyl group may be interrupted by one to three groups (preferably not more

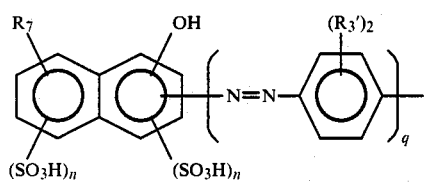

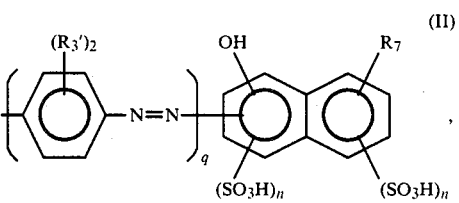

in which

A', q, X' and $R_3'$ are defined above;

n is 0 or 1, with the proviso that at least one n on each naphthalene group is 1;

$R_7$ is $-N(CH_3)_2$, $-N(C_2H_5)_2$, $-N^{\oplus}(CH_3)_3 A^{\ominus}$, $-N^{\oplus}(C_2H_5)_3 A^{\ominus}$ or $-NH-Z_1$ with the proviso that when an $R_7$ is other than $-NH-Z_1$, it is in the 6-, 7- or 8-position,

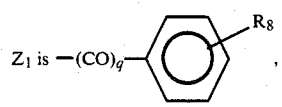

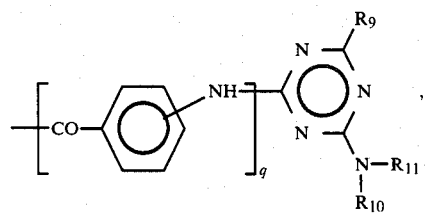

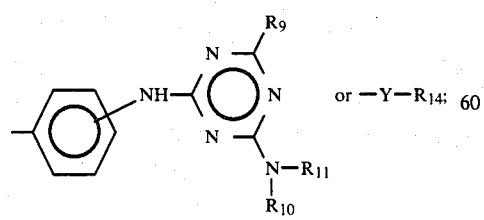

$R_8$ is $-N^{\oplus}(CH_3)_3 A^{\ominus}$, $-N(CH_3)_2$, $-N^{\oplus}(C_2H_5)_3 A^{\ominus}$, $-N(C_2H_5)_2$ or $-NH-Y-R_{12}$;

$R_g$ is than 1) selected from those of the formulae

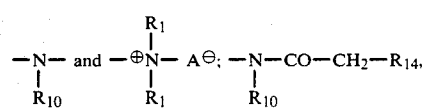

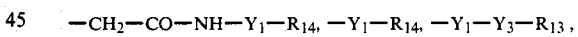

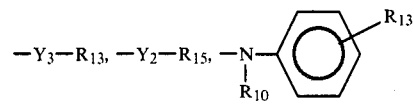

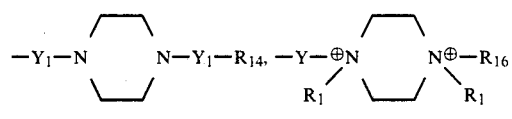

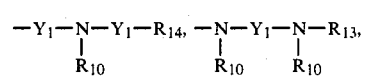

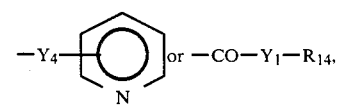

or $R_{10}$ and $R_{11}$ together with the N-atom to which they are attached form a group

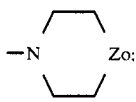

preferably any unsubstituted, substituted and/or interrupted alkyl as $R_{11}$ is uninterrupted, linear or branched, unsubstituted $C_{1-12}$alkyl (more preferably $C_{1-4}$alkyl) or $C_{2-4}$alkyl substituted in the 2-, 3- or 4-position by —OH or —OCH$_3$;

$R_{12}$ is —N($R_{17}$)$_2$ or —N$^{\oplus}$($R_{18}$)$_2$$R_{19}$ A$^{-}$;

$R_{13}$ is a significance of $R_8$ (independent of $R_8$), —CONH—Y$_2$R$_{14}$, —NH—CO—Y$_2$—R$_{14}$, —CO—Y$_2$—R$_{14}$, —SO$_2$—NH—Y$_2$—R$_{14}$, —Y$_2$—R$_{14}$ or —NHNH—COCH$_2$—R$_{14}$;

$R_{14}$ is

—N($R_{17}$)$_2$, —N$^{\oplus}$($R_{18}$)$_2$R$_{19}$ A$^{\ominus}$,

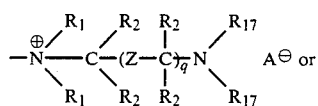

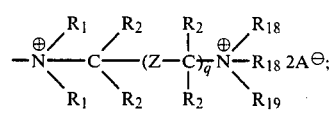

Any Z in $R_{14}$ is preferably Z', more preferably other than —O—, —S— and N(CH$_3$) and most preferably Z'', and any q in $R_{14}$ is preferably 1.

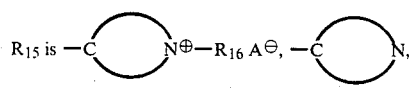

where

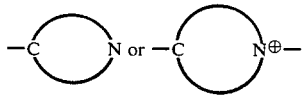

represents an unsaturated heterocyclic group and

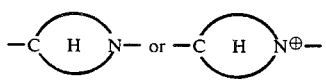

represents a saturated heterocyclic group. Preferably $R_{15}$ is a 5- or 6-membered saturated or unsaturated heterocyclic group. More preferably $R_{15}$ is

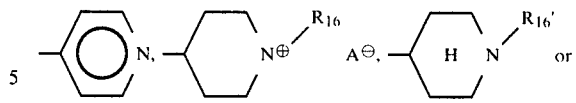

each $R_{16}$, independently, is $C_{1-4}$alkyl, preferably $C_{1-2}$alkyl;

$R_{16}'$ is $C_{2-4}$alkyl substituted by —OH or —NH$_2$ or unsubstituted $C_{1-4}$alkyl, the substituent preferably being in the 2-, 3- or 4-position, each $R_{17}$ independently is hydrogen, $C_{1-4}$alkyl unsubstituted or substituted by one —CONH$_2$ group, $C_{2-4}$alkyl substituted by a group selected from —OH, halogen and —CN or cyclohexyl unsubstituted or substituted by one or two methyl groups (any —OH, halogen or —CN substituent preferably being in the 2-, 3- or 4-position) or both $R_{17}$'s together with the N-atom to which they are attached form an unsubstituted morpholine, piperidine, pyrrolidine, pyrrole, piperazine, or N-methylpiperazine group, each $R_{18}$ independently has one of the non-cyclic significances of $R_{17}$ except hydrogen (independent of $R_{17}$) and $R_{19}$ is $C_{1-4}$alkyl unsubstituted or substituted by phenyl (unsubstituted or substituted by one to three groups selected from halogen, $C_{1-4}$alkyl and $C_{1-4}$alkoxy), cyano, hydroxy, chloro, —CONH$_2$ or cyclohexyl, unsubstituted or substituted by one or two $C_{1-4}$alkyl groups, —CH$_2$—CH=CH$_2$ or —CH$_2$COCH$_3$; or both $R_{18}$'s together with $R_{19}$ and the N-atom to which they are attached form a pyridinium group, unsubstituted or substituted by one or two $C_{1-4}$alkyl groups, or group of the formula

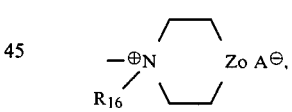

wherein Zo is

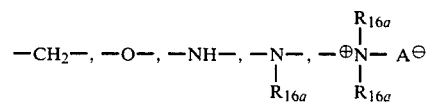

or a direct bond; where $R_{16a}$ has one of the significances of $R_{16}$ or $C_{2-4}$alkyl substituted by —OH or —NH$_2$, preferably in the 2-, 3- or 4-position, Y is $C_{1-6}$alkylene unsubstituted or substituted by —OH or

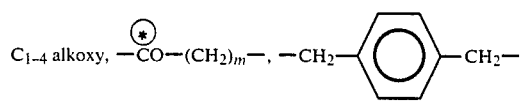

or —NHCOCH₂— where the starred atom is attached to an —NH— group;

Y₁ is linear or branched C₁₋₈alkylene or linear or branched C₃₋₈alkenylene;

Y₂ is linear or branched C₁₋₈alkylene;

Y₃ is arylene (preferably phenylene or naphthylene), further unsubstituted or substituted by one additional R₁₃ group, the —Y₃—R₁₃ or —Y₁—Y₃—R₁₃ group having a total of one or two R₁₃ groups, Y₄ is linear or branched C₃₋₈alkenylene, and m is an integer from 1 to 6 inclusive.

When any Y, Y₁ Y₂ or Y₄ is an unsubstituted or substituted alkylene or alkenylene radical attached to two nitrogen atoms, the two nitrogen atoms are preferably attached to different carbon atoms. Any hydroxy or C₁₋₄alkoxy substituent on Y preferably is separated from each nitrogen atom to which Y is attached by at least two carbon atoms.

Of all the significances of R₇, —NH—Z₁ is the most preferred. Of all the significances of Z₁, —CO—CH₂—R₁₂ and

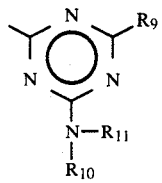

are the most preferred.

More preferred compounds of formula I are of formula III

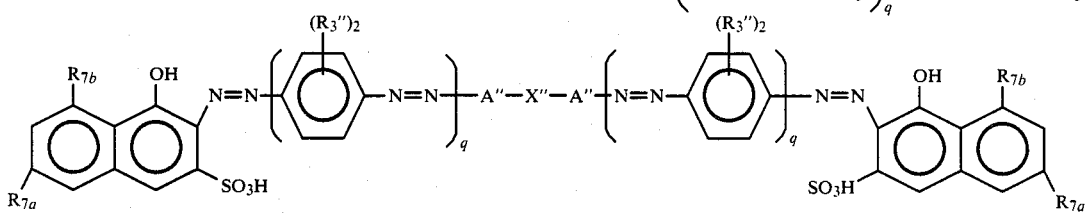

in
which R₃″, A″ and X″ are defined above and either both
R₇ₐ are —SO₃H and both R₇ᵦ are R₇′ or both R₇ₐ are R₇′ and both R₇ᵦ are hydrogen;
R₇′ is —NH—Z₁′, —N(CH₃)₂ or —N⊕(CH₃)₃ A⊖, wherein
Z₁′ is

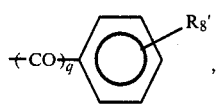

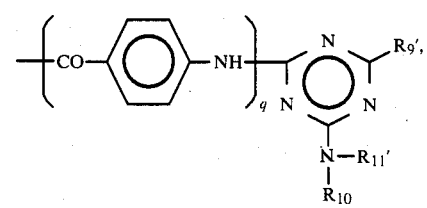

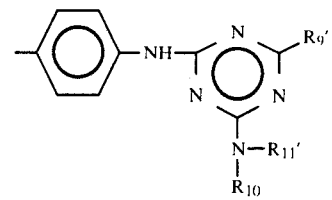

or —Y′—R₁₄′,
where
R₈′ is —N(CH₃)₂, —N⊕(CH₃)₃ A⊖ or —NH—Y′—R₁₂′; R₉′ is Cl, —OH, —NH₂, C₁₋₂alkylamino C₂₋₄hydroxyalkylamino, N,N-di-(C₂₋₄hydroxyalkyl)amino,

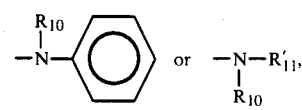

any hydroxy substituent preferably being in the 2-, 3- or 4-position;
Y′ is —CO—CH₂— or —(CH₂)₂₋₃—;
R₁₁′ is

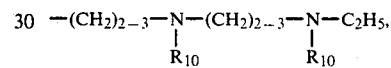

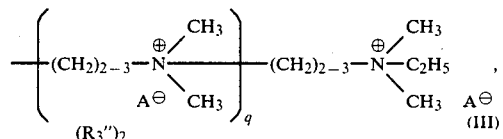

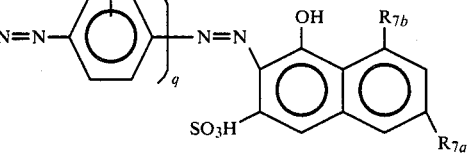

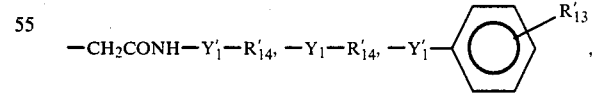

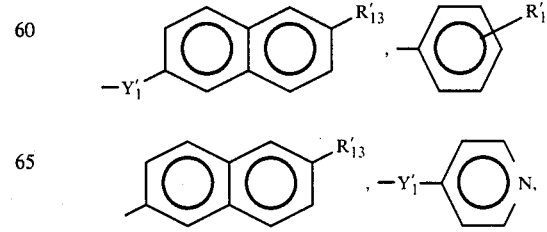

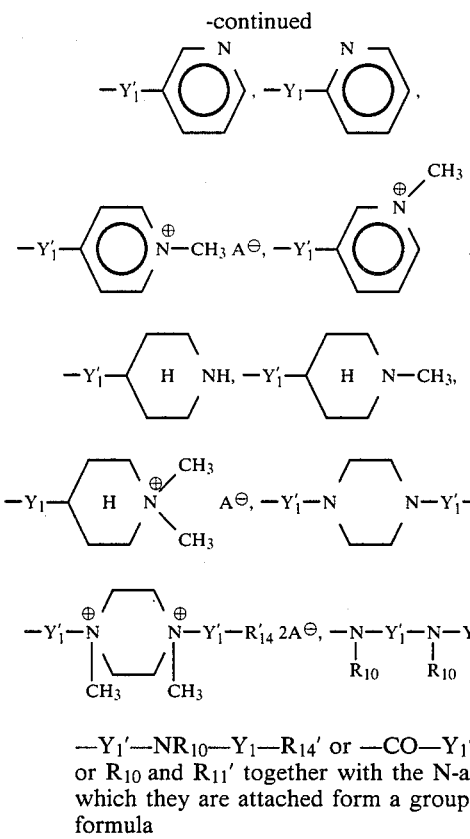

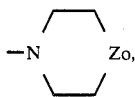

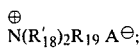

—Y$_1'$—NR$_{10}$—Y$_1$—R$_{14}'$ or —CO—Y$_1'$—R$_{14}'$ or R$_{10}$ and R$_{11}'$ together with the N-atom to which they are attached form a group of the formula $$-N\diagup\diagdown Z_o,$$

where each Y$_1'$, independently, is C$_{1-4}$alkylene; preferably Y$_1'$ is Y$_1''$ where each Y$_1''$ independently is C$_{2-3}$-alkylene; when Y$_1'$ or Y$_1''$ is attached to two nitrogen atoms, the two nitrogen atoms are attached to different carbon atoms; any such Y$_1'$ must therefore have at least two carbon atoms.

R$_{12}'$ is —N(R$_{17}'$)$_2$ or $\overset{\oplus}{N}(R_{18}')_2 R_{19}' A^{\ominus}$;

each R$_{13}'$ independently is —N(CH$_3$)$_2$, —N$^\oplus$(CH$_3$)$_3$ A$^\ominus$, —CONH—Y$_1'$—R$_{14}'$, —NH—CO—Y$_1'$—R$_{14}'$, —CO—Y$_1'$—R$_{14}'$, —SO$_2$NH—Y$_1'$—R$_{14}'$, —Y$_1'$—R$_{14}'$ or —NHNHCOCH$_2$—R$_{14}'$; each R$_{14}'$ independently is

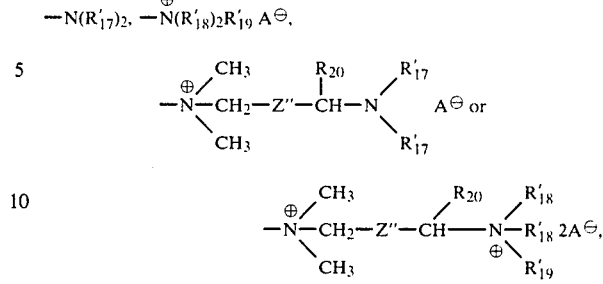

where
Z'' is defined above, and
each R$_{17}'$ independently is hydrogen, methyl, ethyl, cyclohexyl, cyanoethyl, hydroxyethyl or chloroethyl (the cyano, hydroxy or chloro substituent preferably being in the 2-position), both R$_{17}'$'s together with the N-atom to which they are attached form an unsubstituted morpholine, piperidine, pyrrolidine, pyrrole, N-methylpiperazine or piperazine ring and each R$_{18}'$ independently has a significance of R$_{17}'$ except hydrogen and R$_{19}'$ is methyl, ethyl, cyanoethyl, hydroxyethyl, chloroethyl, benzyl, —CH$_2$—CH=CH$_2$, —CH$_2$COCH$_3$ or —CH$_2$CONH$_2$ (the cyano, hydroxy or chloro substituent preferably being in the 2-position) or the two R$_{18}'$'s together with R$_{19}'$ and the N-atom to which they are attached form an unsubstituted pyridinium, α- or β-picolinium or dimethylpyridinium (lutidinium) group or a group of the formula

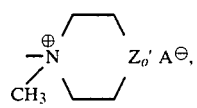

where Zo' is

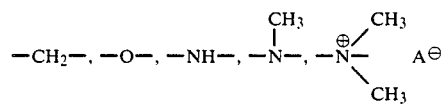

or a direct bond.

Preferred metallised compounds of formula I are of formula IV

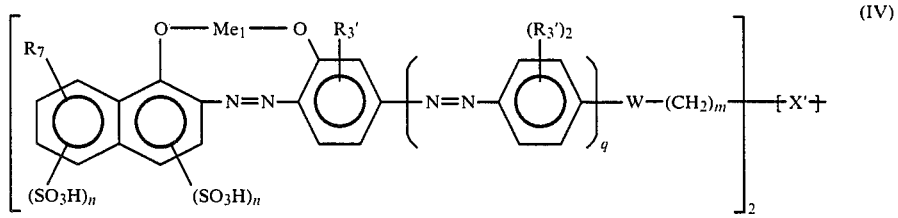

in which
each W independently is —NHCO— or —CONH— where the starred atom is attached to —(CH$_2$)$_m$—;
m is an integer 1 to 6, inclusive;
Me$_1$ is copper, chromium, cobalt, iron, nickel or manganese when the compound of formula IV is in 1:1 metal complex form and $Me_1$ is chromium, cobalt, iron or nickel when the compound of formula IV is in 1:2 metal complex form and the other symbols are as defined above.

More preferred metallised compounds of formula I are of formula V $$\left[ \begin{array}{c} R_{7b} \\ R_{7a} \end{array} \bigcirc\!\!\bigcirc \begin{array}{c} O\text{---}Me_1\text{---}O \\ N=N \\ SO_3H \end{array} \bigcirc \begin{array}{c} R_3'' \\ \end{array} \left[ N=N-\bigcirc_{R_3''} \right]_q -W-(CH_2)_{m'}- \right]_2 \!\!\!-\!\!\!\{X''\}\!\!\!-$$

(V)

where each m' independently is 1, 2, 3 or 4 and the other symbols are defined above.

Preferably the compounds of formulae I to V inclusive are symmetrical, that is to say the significances and positions of the same symbol appearing in each "half" of a formula are the same; in other words, preferably both "halves of the compound joined to X are the same and X itself is symmetrical.

Compounds of formula I can be prepared by diazotising a compound of formula VI $$NH_2\text{-}\!\!\bigcirc\!\!\!-_{(R_3)_2}\!\!\!\!-\!N\!=\!N\!-\!\!\right]_q\!A\!-\!X\!-\!A\!\!\left[\!N\!=\!N\!-\!\bigcirc\!\!\!-_{(R_3)_2}\!\!\!\right]_q\!\!-NH_2 \quad \text{(VI)}$$

and coupling 1 mole of the diazotised compound of formula VI to 2 moles of a coupling component of formula VII $$H\text{---}R \qquad (VII)$$

where R is a coupling component.

Compounds of formula VII are known or may be made from known compounds by known methods. The compounds of formula VI are new and may be made from known compounds by known methods. For example a compound of formula VI may be prepared by reacting 2 moles of a compound of formula IX $$NO_2\text{---}A\text{---}Cl \qquad (IX)$$

with 1 mole of a compound of formula X or XI $$R_1\text{---}N\!\!\bigcirc\!\!N\text{---}R_1 \qquad (X)$$

$$\begin{array}{c} R_1 \\ \diagdown \\ N\text{---}C \\ \diagup \\ R_1 \end{array} \!\!\begin{array}{c} R_2 \\ | \\ R_2 \end{array}\!\!\left(\!\!\begin{array}{c} R_2 \\ | \\ Z\text{---}C \\ | \\ R_2 \end{array}\!\!\right)_q\!\!\begin{array}{c} R_1 \\ \diagup \\ \text{---}N \\ \diagdown \\ R_1 \end{array} \qquad (XI)$$

followed by reduction of the nitro groups to amino groups. The symbols referred to are all defined above.

Compounds of formula I where q is 0 can be prepared by reacting a compound of formula XX $$R\text{---}N\!=\!N\text{---}A_2\text{---}NH\text{---}Acyl \qquad (XX)$$

with water and HCl to form a compound of formula XXI $$R\text{---}N\!=\!N\text{---}A_2\text{---}NH_2 \qquad (XXI)$$

followed by reacting the compound of formula XXI with $ClCOCH_2Cl$ in water at a pH of 7 to form a compound of formula XXII $$R\text{---}N\!=\!N\text{---}A_2\text{---}NHCOCH_2Cl \qquad (XXII)$$

followed by reacting the compound of formula XXII with a bridging group X donating compound in water at a pH of greater than or equal to 7 to form a compound of formula XXII $$(R\text{---}N\!=\!N\text{---}A_2\text{---}NHCOCH_2)_2 X \qquad (XXIII)$$

Coupling of a diazotised compound of formula VI with a compound of formula VII to form a compound of formula I can be carried out according to known methods. Advantageously, coupling is carried out in aqueous, acid, neutral or alkali medium at a temperature from $-10°$ C. to room temperature, if necessary in the presence of a coupling accelerator such as pyridine or urea. Alternatively, coupling may be effected in a mixture of solvents, for example water and an organic solvent.

The compounds of formula I wherein R is a diazo component radical may be similarly obtained by, for example, coupling two moles of a diazotised amine of the formula $$R\text{---}NH_2 \qquad (XII)$$

to one mole of a compound of the formula $$H\text{---}A\text{---}X\text{---}A\text{---}H, \qquad (XIII)$$

$$H\text{---}A\text{---}X\text{---}A\text{---}N\!=\!N\!-\!\!\bigcirc\!\!\!-_{(R_3)_2} \text{or} \qquad (XIV)$$

-continued

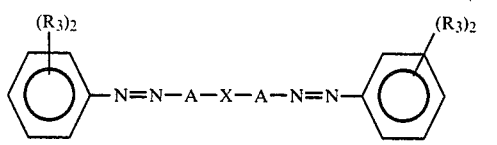
(XV)

utilizing the aforementioned reaction conditions.

The compounds of formulae XII–XV are known or synthesizable by known processes from known compounds.

The foregoing processes may be utilized to synthesize the compounds of formula I having two different R groups as well as those wherein the R groups are identical. As is self-evident, to synthesize a compound of formula I having two different R groups, one must use one mole of each of two different compounds of formula VII or XII, as the case may be. When a compound of formula VI is employed it is usually monodiazotized, the monodiazo compound is coupled with the first compound of formula VII, the resulting compound is then diazotized and the diazonium compound is coupled with the second compound of formula VII. When two compounds of formula XII are utilized, first one is diazotized and coupled onto the compound of formula XIII, XIV or XV and then the second is diazotized and coupled onto the product of the first coupling.

The azo compounds of formula I in 1:1 metal complex form may be prepared by metallising compounds of formula I in metal-free form with a metal selected from copper, cobalt, iron, nickel, manganese, chromium and zinc.

The azo compounds of formula I in 1:2 metal complex form may be prepared by metallising compounds of formula I in metal-free form with a metal selected from chromium, nickel, cobalt and iron.

A further method for the preparation of an azo compound of formula I in 1:2 metal complex form is by reacting an azo compound of formula I in metal-free form with an azo compound 1:1 metal complex when the metal is chromium, nickel, cobalt or iron.

The metallisation process to form a 1:1 metal complex is advantageously carried out by treating 1 mole of azo compound with a metallising agent containing 1 equivalent of metal.

Metallisation is carried out advantageously in aqueous medium or a mixture of water and a water-miscible organic solvent, for example acetone, lower alkanols, dimethylformamide, formamide, glycols or acetic acid at a pH range from 1.0 to 8.0, preferably pH 2 to 7. The metallisation process may be carried out at a temperature from room temperature to the boiling point of the reaction medium.

Alternatively, metallisation may be effected in a wholly organic medium (for example dimethylformamide). Advantageously, for instance, cobaltisation may be carried out in the presence of an inorganic nitrite such as lithium, sodium, ammonium or potassium nitrite in the ratio of 2 to 6 moles of nitrite per gram atom of cobalt.

Suitable cobalt-yielding compounds are, for example, Co (II) and Co (III) sulphate, acetate, formate and chloride.

Copper-yielding compounds are, for example, cupric sulphate, cupric formate, cupric acetate and cupric chloride.

The nickel-yielding compounds are Ni (II) and Ni (III) compounds, such as nickel formate, nickel acetate and nickel sulphate.

Preferred manganese-yielding compounds are Mn (II) compounds and iron-yielding compounds are Fe (II) and Fe (III) compounds. Examples of these and zinc-yielding compounds are manganese, iron and zinc formate, acetate and sulphate.

Preferred chromium-yielding compounds are Cr (II) and Cr (III) formate, acetate and sulphate.

The anions of the compounds of formula I can be exchanged by known methods i.e. ion exchange or by reaction with other salts or acids.

The compounds of formula I may form internal salts; the proton of each sulfo or carboxy group present may protonate a basic group of the molecule and/or the negative charge of a $-COO^{\ominus}$ or $-SO_3^{\ominus}$ group may balance the positive charge of a cationic group.

In the compounds of formula I the anions $A^{\ominus}$ can be any non-chromophoric anions such as those conventional in basic dyestuff chemistry. Suitable anions include chloride, bromide, sulphate, bisulphate, methylsulphate, aminosulphonate, perchlorate, benzenesulphonate, oxalate, maleate, acetate, propionate, lactate, succinate, tartrate, malate, methanesulphonate and benzoate, as well as complex anions, for example, zinc chloride double salts and anions of boric acid, citric acid, glycollic acid, diglycollic acid and adipic acid or addition products of orthoboric acid with polyalcohols with at least one cis diol group present. These anions can be exchanged for each other by ion exchange resins or by reaction with acids or salts (for example via the hydroxide or bicarbonate or according to German Offenlegungsschrift Nos. 2,001,748 or 2,001,816. When a compound contains two or more $A^{\ominus}$ anions, they are usually the same.

When a compound of formula I is in (external) acid addition salt form, each acid of said acid addition salt is non-chromophoric and is suitably an acid corresponding to one of the aforementioned anions. When two or more basic groups are in (external) acid addition salt form, usually each such basic group is in the same acid addition salt form. Usually, the acid of the external acid addition salt corresponds to the $A^{\ominus}$ anions of the cationic groups.

The azo compounds of formula I are suitably worked up into solid or liquid preparations, for example by granulation or by dissolving in a suitable solvent.

The compounds of formula I are suitable for dyeing, padding or printing on fibres, threads or textile materials or regenerated cellulose materials for example cotton, or synthetic polyamides or synthetic polyesters in which the acid groups have been modified. Such a polyamide is described in Belgian Pat. No. 706,104 and such a synthetic polyester is described in U.S. Pat. No. 3,379,723.

The compounds of formula I may also be applied to bast fibers such as hemp, flax, sisal, jute, coir or straw.

The compounds of formula I are also used for dyeing, padding or printing fibres, threads or textiles produced therefrom which consist of or contain homo- or mixed polymers of acrylonitrile or of 1,1-dicyanoethylene.

The textile material is dyed, printed or pad-dyed in accordance with known methods. Acid modified-polyamide is dyed particularly advantageously in an aqueous, neutral or acid medium, at temperatures of 60° C. to boiling point or at temperatures above 100° C. under pressure.

The textile material may also be dyed by the compounds of formula I in organic solvents, e.g. in accordance with the directions given in German Offenlengungschrift No. 2,437,549.

Cellulose material is mainly dyed by the exhaust process i.e. from a long or short bath, at room temperature to boiling temperature, optionally under pressure, whereby the ratio of the bath is from 1:1 to 1:100 and preferably from 1:20 to 1:50. If dyeing is effected from a short bath, then the liquor ratio is 1:5 to 1:15. The pH of the dye bath varies between 3 and 10 (for short and long dyebaths). Dyeing preferably takes place in the presence of electrolytes.

Printing may be effected by impregnation with a printing paste produced by known methods.

The dyes of formula I are also suitable for dyeing or printing paper, e.g. for the production of bulk-dyed, sized and unsized paper. The dyestuffs may similarly be used for dyeing paper by the dipping process. The dyeing of paper is effected by known methods.

The dyes of formula I are also suitable for dyeing or printing leather by known methods.

Dyeings with good fastness are obtained on both paper and leather.

Dyeings made with the dyes of formula I on leather have good light fastness properties, good diffusion properties with PVC, good water-, wash and sweat-fastness properties, good fastness to dry cleaning, good fastness to drops of water and good fastness to hard water.

Dyeings prepared with dyes of formula I on paper produce a substantially-clear spent liquor which is important for environmental reasons. The dyes of formula I have good build-up properties and do not run once applied to paper and are not pH sensitive. Dyeings produced with dyes of formula I have good light fastness and the nuance on exposure for a long time to light fades tone in tone. The dyes of formula I have good wet-fastness properties not only for water but also for milk, soap, water, sodium chloride solution, fruit juice, and sweetened mineral water. Further dyeings made with dyes of formula I are fast for alcoholic beverages due to a good alcohol fastness. Further the dyes of formula I have good nuance stability.

The dyes of formula I may be converted into dyeing preparations. The processing into stable liquid or solid dyeing preparations may take place in a generally known manner, advantageously by grinding or granulating or by dissolving in suitable solvents, optionally adding an assistant, e.g. a stabiliser or dissolving intermediary such as urea. Such preparations may be obtained, for example, as described in French Patent Specifications Nos. 1,572,030 and 1,581,900 or in accordance with German DOS Nos. 2,001,748 and 2,001,816.

Liquid preparations of the compounds of formula I preferably comprise 10 to 30% by weight of a compound of formula I and to 30% of a solubilising agent such as urea, lactic acid or acetic acid, the rest of the composition being water. Solid preparations preferably comprise 20 to 80% dyestuff, 20 to 80% solubilising agent such as urea or $Na_2SO_4$ and 2 to 5% water.

In the following Examples all parts and percentages given are by weight and the temperatures given are in degrees Centigrade, unless indicated to the contrary.

EXAMPLE 1

(i) Preparation of a compound of formula 1a

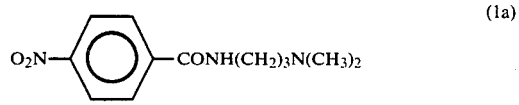

204 Parts of N,N-dimethylaminopropylamine are dissolved in 800 parts of water and this results in a rise in temperature to 40° C. 185 Parts of 4-nitrobenzoyl chloride are then added. After cooling to 5° the product crystallises out in yellow needles, which are filtered, washed with an ice-water mixture and dried.

155 Parts of the compound 1a result having a melting point of 102° to 103.5°.

(ii) Preparation of a compound of formula 1b

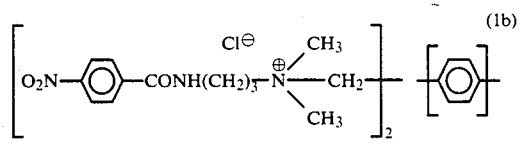

50 Parts of the compound 1a are suspended in 400 parts water and the mixture is heated to 75° and a solution forms. 19.5 g of α,α'-dichloro-p-xylene are added in small portions. After addition is completed, the temperature is raised to 95° followed by cooling to 10°, whereby the product is deposited as white crystals. The pH is brought to 2 by the addition of dilute hydrochloric acid and then the mixture is treated with 50 parts of NaCl. The resulting crystals are filtered, washed with brine and dried. 67 Parts of the compound of formula 1b result.

(iii) Preparation of the compound of formula 1c

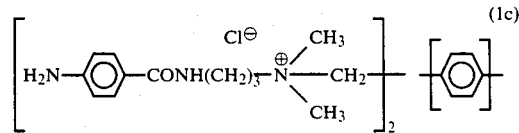

400 Parts of water and 10 parts of glacial acetic acid are heated to 90° and then reacted with 45 parts of iron powder. The mixture is stirred for 30 minutes and then 82 parts of the compound of formula 1b are added. After 2 hours at 95° the reaction is terminated. Sufficient sodium carbonate is then added to bring the pH to 8 to 9. The iron powder sludge is filtered off, and the filtrate is brought to pH 3 by the addition of dilute hydrochloric acid. A solution of about 600 cc is produced containing 60.4 parts of the compound of formula 1c. After standing for for a long time an amount of this compound 1c crystallises out in the solution. The melting point of the compound 1c is 198° to 201°.

EXAMPLE 2

Instead of using 4-nitrobenzoyl chloride in the method of Example 1 an equivalent amount of 3-nitrobenzoyl chloride may be used to produce a compound of formula 2a

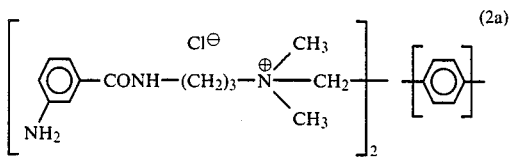

EXAMPLE 3

Instead of using 4-nitrobenzoyl chloride in the method of Example 1, 3- or 4-nitrobenzenesulphonyl chloride may be used. The phenyl group of 4-nitrobenzoyl chloride, 3-nitrobenzoyl chloride or the corresponding sulphonic acid chlorides may be substituted by substituents independently selected from chloro, methyl and methoxy (preferably 1 or 2, more preferably 1).

EXAMPLES 4 to 14

In the method of Example 1 instead of using α,α'-dichloro-p-xylene an equivalent amount of the one of the following compounds may be used.

Cl(CH$_2$)$_2$Cl (Ex. 4); Cl(CH$_2$)$_3$Cl (Ex. 5); Cl(CH$_2$)$_4$Cl (Ex. 6); Cl(CH$_2$)$_5$Cl (Ex. 7); Cl(CH$_2$)$_6$Cl (Ex. 8); Cl(CH$_2$)$_2$—N(CH$_3$)(CH$_2$)$_2$Cl (Ex. 9); ClCH$_2$C(CH$_3$)$_2$CH$_2$Cl (Ex. 10); ClCH$_2$CH=CHCH$_2$Cl (Ex. 11);

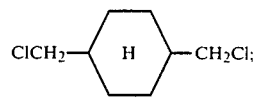
(Ex. 12)

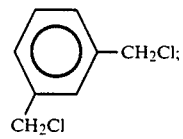
(Ex. 13)

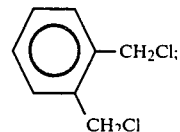
(Ex. 14)

Examples 1 to 14 exemplify intermediates for compounds according to the invention similar to the intermediates of Example 1.

EXAMPLE 15

6 Parts of the compound 1c of Example 1 are tetrazotised by a known method and then coupled to 11.5 parts of a compound of formula 15a

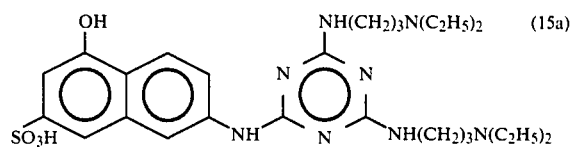

by known method.

17 Parts of a compound of formula 15b

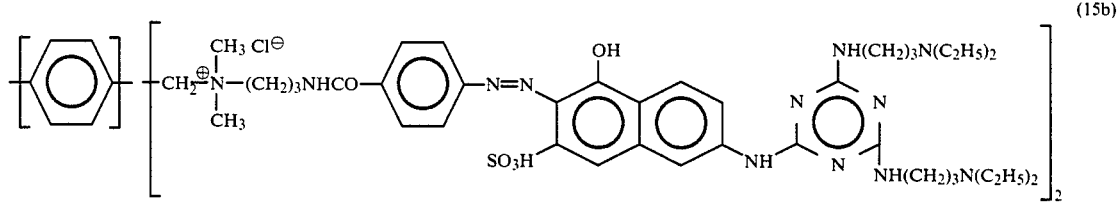

In acid addition salt form the compound 15b dyes paper an orange colour and the dyeings so produced have good fastness properties. In a similar manner an equivalent amount of an intermediate of any one of Examples 2 to 15 can be used in place of the compound 1c.

EXAMPLE 16

6 Parts of compound 1c of Example 1 are tetrazotised and then added to an acid solution containing 2.8 parts of 2-methoxy-5-methylaniline to produce, according to a known method, a compound of formula 16a.

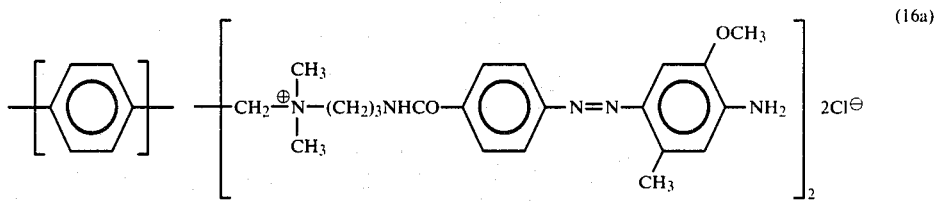

Then the compound of formula 16a is filtered, suspended in water and the resulting mixture is acidified with hydrochloric acid. The mixture is brought to 20° and the compound 16a is tetrazotised and then coupled to 13 parts of a compound of formula 16b In acid addition salt form this compound dyes paper a navy blue tone and the dyeings so produced have good fastnesses.

EXAMPLES 17 to 33

Compounds of the formula in which the symbols are defined in the Table 1 below.

The compounds of Examples 17 to 19, 27, 28, 31 and 32 dye paper a bordeaux red tone, those of Examples 20 and 21 dye paper a reddish orange, those of Examples 22, 24, 29 and 30 dye paper an orange tone, those of Examples 23 and 25 a red tone, that of Example 26 a brown tone and that of Example 33 a bluish-red tone. All these compounds have good fastnesses.

A compound of the formula (16c)

TABLE 1

| EX. No. | q | R₂₀ | R₂₁ | R₂₂ | R₂₃ |
|---|---|---|---|---|---|
| 17 | 0 | —NH—[triazine ring with NHC₃H₆N(CH₃)₂ and NHC₃H₆N(CH₃)₂ substituents] | H | —SO₃H | H |
| 18 | 0 | —NH—[triazine ring with NHNHCOCH₂N⁺(CH₃)₃ and NHNHCOCH₂N⁺(CH₃)₃ substituents, 2A⁻] | H | " | H |
| 19 | 0 | —NHCO—[phenyl]—NH—[triazine ring with NHC₃H₆N(C₂H₅)₂ and NHC₃H₆N(C₂H₅)₂] | H | " | H |
| 20 | 0 | H | H | —NHC₂H₄NH₂ | H |
| 21 | 0 | H | H | —NHC₃H₆N(CH₃)₂ | H |
| 22 | 0 | H | H | —NHCOCH₂N⁺(CH₃)₃ A⁻ | H |
| 23 | 0 | H | H | —N⁺(CH₃)₃ A⁻ | H |
| 24 | 0 | H | H | —NHCO—[phenyl]—N⁺(CH₃)₃ A⁻ | H |
| 25 | 0 | H | H | —NH—[phenyl]—NH—[triazine ring with NHC₃H₆N(C₂H₅)₂ and NHC₃H₆N(C₂H₅)₂] | H |
| 26 | 0 | H | —NHC₃H₆N(C₂H₅)₂ | H | H |

TABLE 1-continued

| EX. No. | q | R$_{20}$ | R$_{21}$ | R$_{22}$ | R$_{23}$ |
|---|---|---|---|---|---|
| 27 | 0 | H | H | H | -NH-[triazine ring with NHC$_3$H$_6$N(C$_2$H$_5$)$_2$ substituents] |
| 28 | 0 | -NH-[triazine ring with NHC$_3$H$_6$N(C$_2$H$_5$)$_2$ substituents] | H | H | H |
| 29 | 0 | H | H | -NH-[triazine ring with NHC$_3$H$_6$N(C$_2$H$_5$)$_2$ and piperazinium-N,N-dimethyl A$^\ominus$ substituent] | H |
| 30 | 0 | H | H | -NH-[triazine with NHC$_2$H$_4$CH and NH-phenyl-N(CH$_3$)$_3^\oplus$ A$^\ominus$ substituents] | H |
| 31 | 0 | -NH-[triazine ring with two piperazinium-N,N-dimethyl groups, 2A$^\ominus$] | H | -SO$_3$H | H |

TABLE 1-continued
| EX. No. | q | R20 | R21 | R22 | R23 |
|---|---|---|---|---|---|
| 32 | 0 | 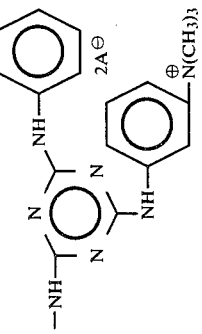 | H | —SO₃H | H |
| 33 | 1 | H | H |  | H |

EXAMPLE 34

The compound 16c can be metallised according to known methods with copper to give a compound of formula (34a)

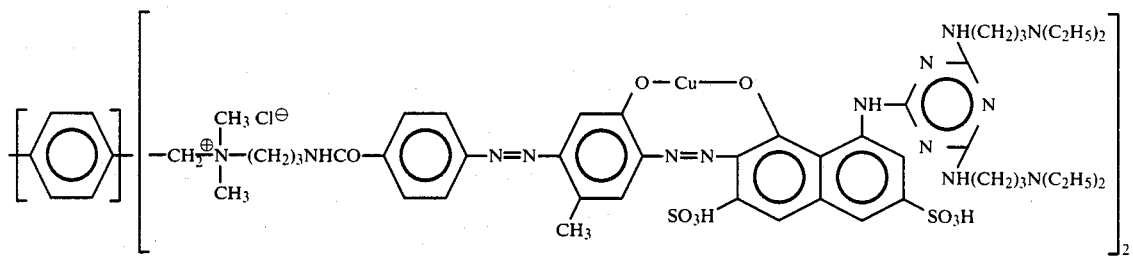

In acid addition salt form this compound dyes paper grey-blue in colour and the dyeings so produced have good fastness properties.

The coupling components of the preceding Examples are prepared by known methods, for example according to U.S. Pat. No. 2,365,345.

EXAMPLE 35

5.1 Parts (1/100 mole) of a diamine of formula (35a)

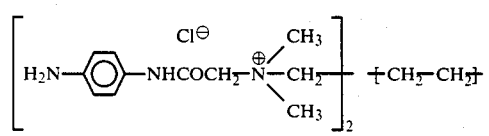

(35a)

is diazotised by a known method and coupled to 12.2 parts (2/100 mole) of a compound of formula 35b

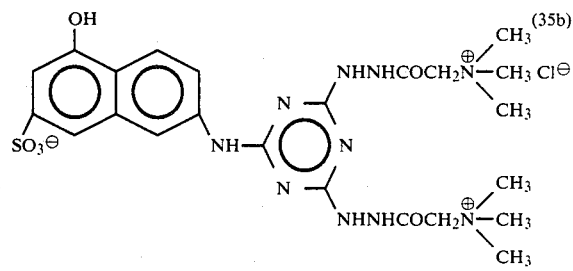

to form a compound of formula 35c

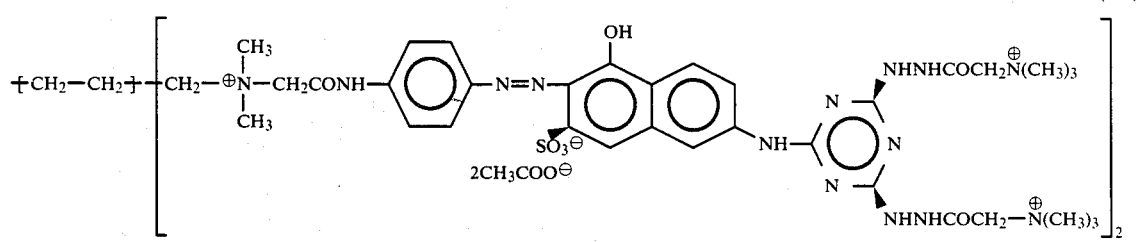

The compound 35c dyes paper a scarlet-red colour and dyeings so produced have good fastness properties.

EXAMPLE 36

According to a similar method to that of Example 35, a compound of formula 36a

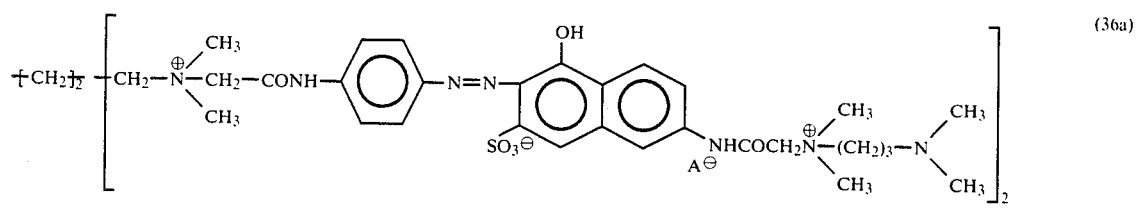

(36a)

can be prepared. The coupling component

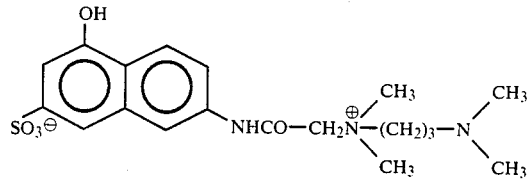

is new and may be made from known compounds by known methods.

EXAMPLE 37 TO 63

Compounds of formula

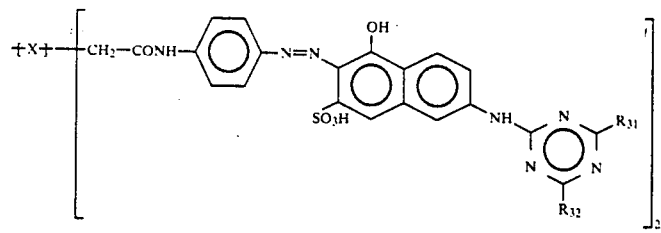

in which the symbols are defined in Table 2 below, may be prepared by a method analogous to that of Example 35.

TABLE 2

| EX. No. | X | $R_{31}$ | $R_{32}$ |
|---|---|---|---|
| 37 | piperazine bis-methyl quaternary $2A^{\ominus}$ | $-NH(CH_2)_3N(C_2H_5)_2$ | as $R_{31}$ |
| 38 | $-\overset{\oplus}{N}(CH_3)_2-(CH_2)_4-\overset{\oplus}{N}(CH_3)_2-$ $2A^{\ominus}$ | $-NHNHCOCH_2\overset{\oplus}{N}(CH_3)_3 \; A^{\ominus}$ | $-NH(CH_2)_2NH(CH_2)_2NH_2$ |
| 39 | $-\overset{\oplus}{N}(CH_3)_2-(CH_2)_4-\overset{\oplus}{N}(CH_3)_2-$ $2A^{\ominus}$ | $-NHNHCOCH_2\overset{\oplus}{N}(CH_3)_3 \; A^{\ominus}$ | as $R_{31}$ |
| 40 | $-\overset{\oplus}{N}(CH_3)_2-(CH_2)_4-\overset{\oplus}{N}(CH_3)_2-$ $2A^{\ominus}$ | $-NH(CH_2)_3N(C_2H_5)_2$ | as $R_{31}$ |
| 41 | $-\overset{\oplus}{N}(CH_3)_2-CHCH_2\overset{\oplus}{N}(CH_3)_2-$ with $CH_3$ branch $2A^{\ominus}$ | $-NH(CH_2)_3N(C_2H_5)_2$ | as $R_{31}$ |
| 42 | $-\overset{\oplus}{N}(CH_3)_2-(CH_2)_3-\overset{\oplus}{N}(CH_3)_2-$ $2A^{\ominus}$ | $-NH(CH_2)_3N(C_2H_5)_2$ | as $R_{31}$ |

TABLE 2-continued

| EX. No. | X | R₃₁ | R₃₂ |
|---|---|---|---|
| 43 | $-\overset{\oplus}{N}(CH_3)_2-(CH_2)_2-\overset{\oplus}{N}(CH_3)-(CH_2)_2-\overset{\oplus}{N}(CH_3)_2-$  2A⊖ | $-NH(CH_2)_3N(C_2H_5)_2$ | as R₃₁ |
| 44 | $-\overset{\oplus}{N}(CH_3)_2-(CH_2)_2-\overset{\oplus}{N}(CH_3)-(CH_2)_2-\overset{\oplus}{N}(CH_3)_2-$  2A⊖ | $-NHNHCOCH_2\overset{\oplus}{N}(CH_3)_3$  A⊖ | as R₃₁ |
| 45 | piperazine-N,N'-dimethyl diquat (CH₃, CH₃)  2A⊖ | $-NHNHCOCH_2\overset{\oplus}{N}(CH_3)_3$  A⊖ | as R₃₁ |
| 46 | piperazine-N,N'-dimethyl diquat  2A⊖ | $-NHNHCOCH_2\overset{\oplus}{N}(CH_3)_3$  A⊖ | $-NH(CH_2)_3N(C_2H_5)_2$ |
| 47 | piperazine-N,N'-dimethyl diquat  2A⊖ | $-NHNHCOCH_2\overset{\oplus}{N}(CH_3)_3$  A⊖ | $-N(CH_3)-C_6H_5$ |
| 48 | piperazine-N,N'-dimethyl diquat  2A⊖ | $-NHNHCOCH_2\overset{\oplus}{N}(CH_3)_3$  A⊖ | $-NHCH_2CH_2OH$ |
| 49 | piperazine-N,N'-dimethyl diquat  2A⊖ | $-NHNHCOCH_2-N(\text{piperidinyl})$ | as R₃₁ |
| 50 | piperazine-N,N'-dimethyl diquat  2A⊖ | $-NHNHCOCH_2-N(\text{piperidinyl})$ | $-NHCH_2CH_2NH_2$ |
| 51 | piperazine-N,N'-dimethyl diquat  2A⊖ | $-NHNHCOCH_2-N(\text{piperidinyl})$ | $-NH(CH_2)_3N(C_2H_5)_2$ |
| 52 | piperazine-N,N'-dimethyl diquat  2A⊖ | $-NHNHCOCH_2\overset{\oplus}{N}(\text{pyridinyl})$  A⊖ | $-NH(CH_2)_3N(C_2H_5)_2$ |
| 53 | $-\overset{\oplus}{N}(CH_3)_2-(CH_2)_2-N(CH_3)-(CH_2)_2-\overset{\oplus}{N}(CH_3)_2-$  2A⊖ | $-NH(CH_2)_3N(C_2H_5)_2$ | $-NHCH_2CH_2NH_2$ |
| 54 | $-\overset{\oplus}{N}(CH_3)_2-(CH_2)_2-N(CH_3)-(CH_2)_2-\overset{\oplus}{N}(CH_3)_2-$  2A⊖ | $-NHNHCOCH_2\overset{\oplus}{N}(CH_3)_3$  A⊖ | $-NHCH_2CH_2NH_2$ |
| 55 | $-\overset{\oplus}{N}(CH_3)_2-(CH_2)_2-N(CH_3)-(CH_2)_2-\overset{\oplus}{N}(CH_3)_2-$  2A⊖ | $-NHNHCOCH_2\overset{\oplus}{N}(CH_3)_3$  A⊖ | $-NH(CH_2)_2NH(CH_2)_2NH_2$ |

TABLE 2-continued

| EX. No. | X | R₃₁ | R₃₂ |
|---|---|---|---|
| 56 | $-\overset{\oplus}{\underset{CH_3}{\underset{|}{N}}}(CH_3)-(CH_2)_2-\overset{CH_3}{\underset{|}{N}}-(CH_2)_2-\overset{\oplus}{\underset{CH_3}{\underset{|}{N}}}(CH_3)$  2A⊖ | $-NHNHCOCH_2\overset{\oplus}{N}(CH_3)_3$  A⊖ | $-NH(CH_2)_3OCH_3$ |
| 57 | $-\overset{\oplus}{\underset{CH_3}{\underset{|}{N}}}(CH_3)-(CH_2)_2-\overset{CH_3}{\underset{|}{N}}-(CH_2)_2-\overset{\oplus}{\underset{CH_3}{\underset{|}{N}}}(CH_3)$  2A⊖ | $-NHNHCOCH_2\overset{\oplus}{N}(CH_3)_3$  A⊖ | as R₃₁ |
| 58 | $-\overset{\oplus}{\underset{CH_3}{\underset{|}{N}}}(CH_3)-(CH_2)_2-\overset{CH_3}{\underset{|}{N}}-(CH_2)_2-\overset{\oplus}{\underset{CH_3}{\underset{|}{N}}}(CH_3)$  2A⊖ | $-NHNHCOCH_2N$ (piperidine) | as R₃₁ |
| 59 | $-\overset{\oplus}{\underset{CH_3}{\underset{|}{N}}}(CH_3)-(CH_2)_2-\overset{CH_3}{\underset{|}{N}}-(CH_2)_2-\overset{\oplus}{\underset{CH_3}{\underset{|}{N}}}(CH_3)$  2A⊖ | $-NHNHCOCH_2N$ (morpholine) | as R₃₁ |
| 60 | $-\overset{\oplus}{\underset{CH_3}{\underset{|}{N}}}(CH_3)-(CH_2)_2-\overset{CH_3}{\underset{|}{N}}-(CH_2)_2-\overset{\oplus}{\underset{CH_3}{\underset{|}{N}}}(CH_3)$  2A⊖ | $-NHNHCOCH_2\overset{\oplus}{N}(CH_3)(piperazine)N-CH_3$  A⊖ | $-NHCH_2CH_2OH$ |
| 61 | $-\overset{\oplus}{\underset{CH_3}{\underset{|}{N}}}(CH_3)-(CH_2)_2-\overset{CH_3}{\underset{|}{N}}-(CH_2)_2-\overset{\oplus}{\underset{CH_3}{\underset{|}{N}}}(CH_3)$  2A⊖ | $-NHNHCOCH_2\overset{\oplus}{N}(CH_3)(piperazine)N-CH_3$  A⊖ | $-N(CH_3)C_6H_5$ |
| 62 | $-\overset{\oplus}{\underset{CH_3}{\underset{|}{N}}}(CH_3)-(CH_2)_2-\overset{CH_3}{\underset{|}{N}}-(CH_2)_2-\overset{\oplus}{\underset{CH_3}{\underset{|}{N}}}(CH_3)$  2A⊖ | $-NHNHCOCH_2\overset{\oplus}{N}(CH_3)$ (pyrrolidinium)  A⊖ | as R₃₁ |
| 63 | $-\overset{\oplus}{\underset{CH_3}{\underset{|}{N}}}(CH_3)-(CH_2)_2-\overset{CH_3}{\underset{|}{N}}-(CH_2)_2-\overset{\oplus}{\underset{CH_3}{\underset{|}{N}}}(CH_3)$  2A⊖ | $-NHNHCOCH_2-N$ (pyrrolidine) | as R₃₁ |

EXAMPLES 64 TO 80

Compounds of the formula

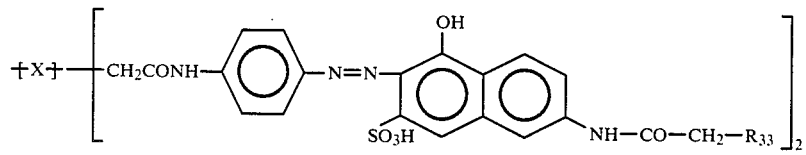

in which the symbols are defined in Table 3 below can be made by a method analogous to that of Example 35. The colour of the compound of Examples 50 and 51 is scarlet. The colour of compounds of Examples 64 to 80 is scarlet.

TABLE 3

| EX. No. | X | R₃₃ |
|---|---|---|
| 64 | $-\overset{\oplus}{\underset{CH_3}{\underset{|}{N}}}(CH_3)-(CH_2)_4-\overset{\oplus}{\underset{CH_3}{\underset{|}{N}}}(CH_3)$  2A⊖ | $-\overset{\oplus}{\underset{CH_3}{\underset{|}{N}}}(CH_3)-(CH_2)_3-N(C_2H_5)_2$  A⊖ |
| 65 | " | $\overset{\oplus}{N}(CH_3)_3$  A⊖ |

TABLE 3-continued

| EX. No. | X | $R_{33}$ |
|---|---|---|
| 66 | $-\overset{\overset{CH_3}{\mid}}{\underset{\underset{CH_3}{\mid}}{N^{\oplus}}}-(CH_2)_2-\overset{\overset{CH_3}{\mid}}{N}-(CH_2)_2-\overset{\overset{CH_3}{\mid}}{\underset{\underset{CH_3}{\mid}}{N^{\oplus}}}-\quad 2A^{\ominus}$ | " |
| 67 | " | $-\overset{\overset{CH_3}{\mid}}{\underset{\underset{CH_3}{\mid}}{N^{\oplus}}}-(CH_2)_2-\overset{\overset{CH_3}{\mid}}{N}-(CH_2)_2N(CH_3)_2 \quad A^{\ominus}$ |
| 68 | " | $-\overset{\overset{CH_3}{\mid}}{\underset{\underset{CH_3}{\mid}}{N^{\oplus}}}-CH_2CH_2-OH \quad A^{\ominus}$ |
| 69 | " | $-\overset{\overset{CH_3}{\mid}}{\underset{\underset{CH_3}{\mid}}{N^{\oplus}}}-CH_2-\text{C}_6\text{H}_5 \quad A^{\ominus}$ |
| 70 | " | $-\overset{\overset{CH_3}{\mid}}{\underset{\underset{CH_3}{\mid}}{N^{\oplus}}}-(CH_2)_3-\text{N-morpholino} \quad A^{\ominus}$ |
| 71 | $-\overset{\overset{CH_3}{\mid}}{\underset{\underset{CH_3}{\mid}}{N^{\oplus}}}-(CH_2)_2-\overset{\overset{CH_3}{\mid}}{N}-(CH_2)_2-\overset{\overset{CH_3}{\mid}}{\underset{\underset{CH_3}{\mid}}{N^{\oplus}}}-\quad 2A^{\ominus}$ | $-\text{N-piperidinyl (NH)}$ |
| 72 | " | $-\text{N}(\text{piperazinyl})-\text{N}-CH_3$ |
| 73 | " | $-\overset{\oplus}{\underset{\underset{CH_3}{\mid}}{N}}(\text{piperazinyl})-N-CH_3 \quad A^{\ominus}$ |
| 74 | " | $-\text{N-pyrrolidinyl}$ |
| 75 | $CH_3-\overset{\oplus}{N}(\text{piperazinyl})\overset{\oplus}{N}-CH_3 \quad 2A^{\ominus}$ | $-\text{N-piperidinyl (NH)}$ |
| 76 | " | $-\text{N}(\text{piperazinyl})-\text{N}-CH_3$ |
| 77 | " | $-\overset{\oplus}{\underset{\underset{CH_3}{\mid}}{N}}(\text{piperazinyl})-N-CH_3 \quad A^{\ominus}$ |
| 78 | " | $-\overset{\oplus}{\underset{\underset{CH_3}{\mid}}{N}}\text{-pyrrolidinyl} \quad A^{\ominus}$ |

TABLE 3-continued

| EX. No. | X | $R_{33}$ |
|---|---|---|
| 79 | " | $-N(C_2H_5)_2$ (diethyl) |
| 80 | " | $-N(n-C_4H_9)_2$ |

EXAMPLE 81

(a) Preparation of a compound of formula 81a

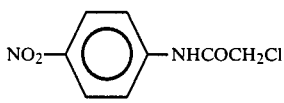
(81a)

119 Parts of chloroacetyl chloride is added dropwise to a solution of 138 parts of p-nitroaniline in 150 parts of dimethylformamide (DMF) which solution is cooled to 0°–2°. With the addition of the chloride the temperature rises to 20° and the solution is kept at this temperature. The suspension is stirred for 30 minutes and then reacted with 200 g ice. After filtering, washing and drying, 210 parts the compound 81a results.

(b) Preparation of a compound of formula 81b

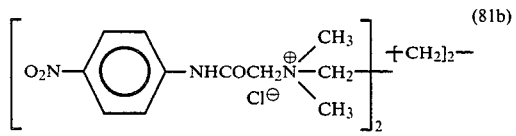
(81b)

22.45 Parts of the compound 81a are dissolved in 100 parts DMF. After addition of 7.2 parts of 1,4-bis-(dimethylamino)butane the solution is warmed to 40°. After stirring for 10 hours at 40° a viscous yellow suspension results which is diluted with 200 parts of acetone and filtered. The residue of filtration is washed with 800 parts acetone. After drying 25 parts of the compound 81b results.

(c) Preparation of a compound of formula 81c (81c)

15 Parts of iron powder are mixed in 120 parts water and 3 parts of glacial acetic acid for 20 minutes at 95°. After cooling to 60° a suspension of 25 parts of compound 81b, 150 parts of 90% ethanol and 150 parts of water are added dropwise as fast as possible so that the temperature is held at 55° to 60°. The mixture is stirred for a further 2 hours at 55° to 60° and the pH is brought to 8 by the addition of sodium carbonate.

The suspension is filtered and the filtrate contains 20 parts of the compound of formula 81c.

(d) Preparation of a compound of formula 81d

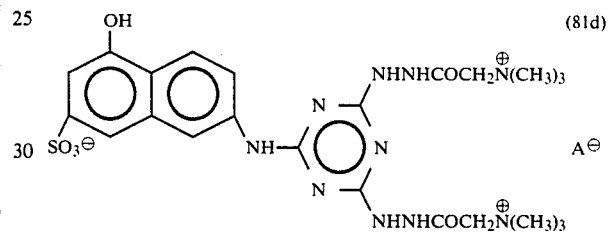
(81d)

36.8 Parts of cyanuric chloride are suspended in 30 g of ice and 30 g of water over 20 minutes at 0° to 3° and then homogenised. A solution of 68.4 parts of acetylhydrazide trimethylammonium chloride (a Girard Reagent) in 50 parts water is added dropwise so that at the end of the addition the temperature has risen to 22°. During addition the pH is held at 3 to 4 by the addition of a 20% sodium carbonate solution. This solution is added to 43 parts of 2-amino-5-hydroxynaphthalene-7-sulphonic acid and the temperature is raised to 90° and the pH is held at 3 to 4 by the addition of 30% sodium hydroxide solution. After dissolving all the sulphonic acid 40 parts of a compound of formula 81d result.

In a similar fashion to that of Example 16 a compound of the formula

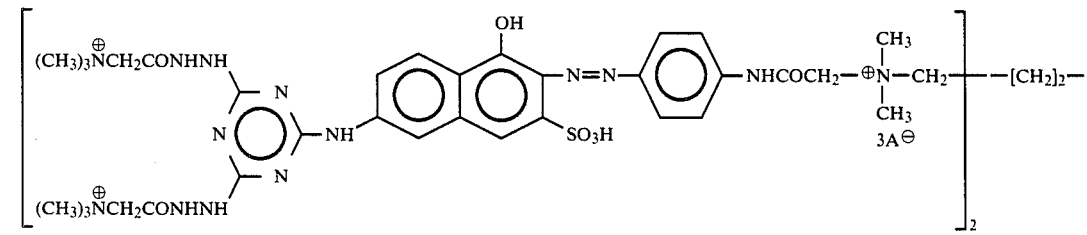

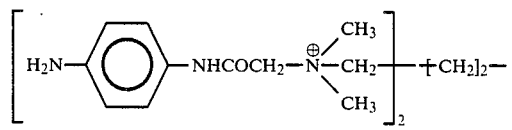

can be formed by diazotising the compound 81c and coupling with compound 81d in a mol ratio of 2:1.

EXAMPLES 82 AND 83

Compounds of formula 82a and 82b

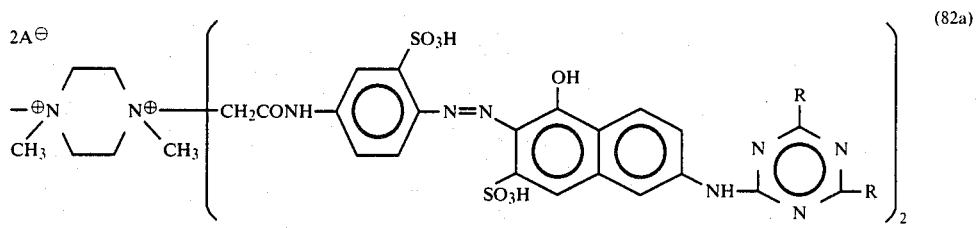

where each R is —NHNHCOCH$_2$N$^\oplus$(CH$_3$)$_3$A$^\ominus$

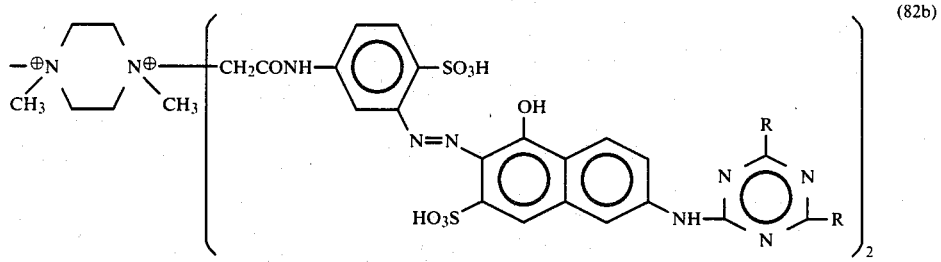

where R is as above.

APPLICATION EXAMPLE A

70 Parts of chemically bleached sulphite cellulose obtained from pinewood and 30 parts of chemically bleached sulphite cellulose obtained from birchwood are ground in 2000 parts of water in a Hollander. 0.5 Parts of the dyestuff from Example 35 (of formula 35c) are sprinkled into this pulp. Paper is produced from this pulp after mixing for 20 minutes. The absorbent paper which is obtained in this manner is dyed in a scarlet tone. The spent liquor is practically colourless.

APPLICATION EXAMPLE B 0.5 Parts of the dyestuff from Example 35 (of formula 35c) are dissolved in 100 parts of hot water are cooled to room temperature. This solution is added to 100 parts of chemically bleached sulphite cellulose which have been ground in a Hollander with 200 parts of water. Sizing takes place after thorough mixing for 15 minutes. The paper which is produced from this material has a scarlet tone and good light- and wet-fastness.

APPLICATION EXAMPLE C

An absorbent length of unsized paper is drawn at 40° to 50° C. through a dyestuff solution having the following composition:
0.5 parts of the dyestuff from Example 35 (of formula 35c)
0.5 parts of starch and
99.0 parts of water.

The excess dyestuff solution is squeezed out through two rollers. The dried length of paper is dyed in a scarlet tone.

APPLICATION EXAMPLE D

2 Parts of the dyestuff of Example 35 (of formula 35c) are dissolved in 4000 parts demineralised water at 40° C. 100 Parts of a pre-wetted cotton textile substrate are added, and the bath is raised to boiling point over 30 minutes and held at the boil for 1 hour. After rinsing and drying, a scarlet dyeing is obtained having good light- and wet-fastnesses. The dye exhausts practically quantitatively, and the spent liquor is almost colourless.

APPLICATION EXAMPLE E

100 Parts freshly tanned and neutralised chrome leather are agitated for 30 minutes in a vessel with a dyebath of 250 parts water at 55° C. and 1 part of the dyestuff of Example 1 in acid addition salt form, and then treated in the same bath for 30 minutes with 2 parts of an anionic fatty liquor based on sulphonated train oil. The leather is then dried and prepared in the normal way, giving a leather evenly dyed in a black tone.

Other low affinity vegetable-tanned leathers can similarly be dyed by known methods.

The dyestuffs of any of the other Examples may be used in place of the particular dyestuff mentioned in any of the Application Examples A to E in the form of solid or liquid preparations.

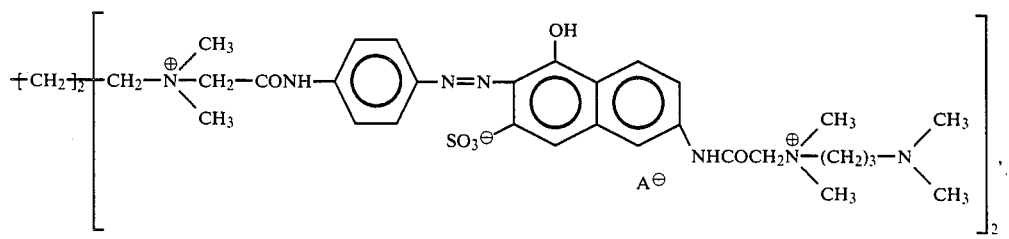

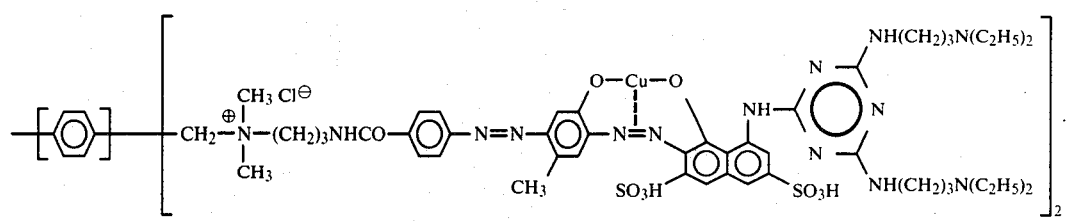

What is claimed is:

1. A metal-free compound of the formula

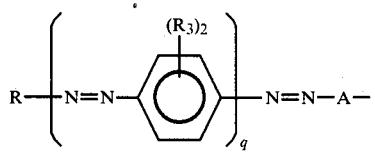

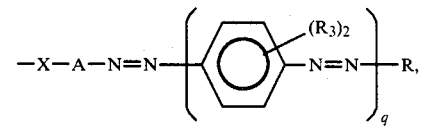

a 1:1 or 1:2 metal complex of a metal-free compound of said formula or an acid addition salt of a metal-free compound of said formula or of a 1:1 or 1:2 metal complex of a metal-free compound of said formula, wherein each A is independently —A$_1$—NH-CO—A$_2$—, —A$_1$—NHSO$_2$—A$_2$— or —A$_1$—CONH—A$_2$—, wherein $A_1$ is linear or branched $C_{1-8}$-alkylene or linear or branched $C_{1-8}$alkylene substituted by 1 to 3 substituents independently selected from halo, cyano, hydroxy and phenyl and is attached to X, $A_2$ is phenylene; phenylene substituted by 1 to 3 substituents independently selected from $C_{1-6}$-alkyl, $C_{1-6}$alkoxy, $(C_{1-4}alkyl)$carbonylamino, halo, hydroxy and sulfo; naphthylene; naphthylene substituted by 1 to 3 substituents independently selected from $C_{1-4}$alkyl, $C_{1-4}$alkoxy, $(C_{1-4}\text{-alkyl})$carbonylamino and halo; a 5- or 6-membered heterocyclic group;

*phenylene-pyrazolyl; *phenylene pyrazolyl the phenylene radical of which is substituted by 1 to 3 substituents independently selected from $C_{1-4}$alkyl, $C_{1-4}$alkoxy, $(C_{1-4}\text{-alkyl})$carbonylamino and halo; or

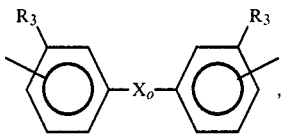

wherein
$X_o$ is a direct bond or linear or branched $C_{1-4}$alkylene,
$R_3$ is as defined below, and the * denotes the end of the radical that is attached to the —NHCO—, —NHSO$_2$— or —CONH— radical,
each R is independently a diazo component radical or a coupling component radical,
each $R_3$ is independently hydrogen; halo; hydroxy; $C_{1-6}$alkyl; $C_{1-6}$alkyl substituted by 1 to 3 substituents independently selected from halo, cyano, and hydroxy and phenyl; or $C_{1-6}$-alkoxy, and
X is

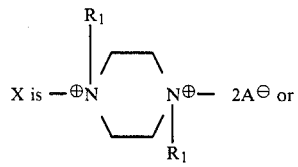

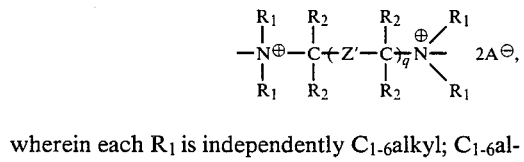

wherein each $R_1$ is independently $C_{1-6}$alkyl; $C_{1-6}$alkyl substituted by 1 to 3 substituents independently selected from halo, cyano, hydroxy and phenyl; $C_{3-6}$alkenyl or $C_{3-6}$alkenyl substituted by 1 to 3 substituents independently selected from halo, cyano, hydroxy and phenyl, each $R_2$ is independently hydrogen; $C_{1-6}$alkyl; $C_{1-6}$alkyl substituted by 1 to 3 substituents independently selected from halo, cyano, hydroxy and phenyl; $C_{3-6}$alkenyl or $C_{3-6}$-alkenyl substituted by 1 to 3 substituents independently selected from halo, cyano, hydroxy and phenyl, Z' is a direct bond; —O—; —S—; —NCH$_3$—; linear or branched $C_{1-10}$alkylene; linear or branched $C_{2-10}$alkylene interrupted by —O—, —S— or —NCH$_3$—; linear or branched $C_{2-10}$alkenylene; phenylene; phenylene substituted by 1 or 2 $C_{1-4}$alkyl groups; cyclohexylene; cyclohexylene monosubstituted by $C_{1-4}$-alkyl; or

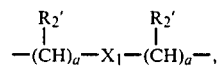

wherein $X_1$ is

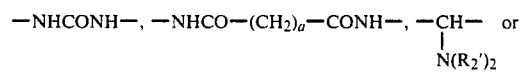

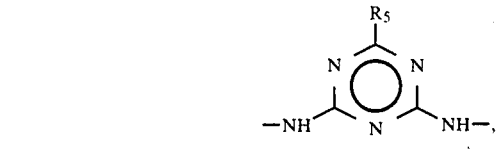

wherein $R_5$ is hydroxy, chloro, —N(R$_6$)$_2$ or methoxy, wherein each $R_6$ is independently hydrogen, $C_{1-4}$-alkyl or phenyl,
each A$^\ominus$ is independently a non-chromophoric anion,
wherein each $R_2'$ is independently hydrogen, $C_{1-4}$alkyl or $C_{1-4}$alkyl substituted by hydroxy, cyano or halo,
each a is independently 0, 1, 2, 3, 4, 5 or 6,
each q is independently 0 or 1, and
each halo is independently chloro or bromo, with the provisos that (i) the sum of the cationic and basic groups exceeds the sum of the sulfo and carboxy groups and (ii) the metal-free compound or 1:1 or 1:2 metal complex may be in acid addition salt form only if it contains at least one basic non-cationic group.

2. A metal-free compound, a 1:1 or 1:2 metal complex or an acid addition salt according to claim 1 which is (i) a metal-free compound of the formula

(ii) a 1:1 or 1:2 metal complex of the formula

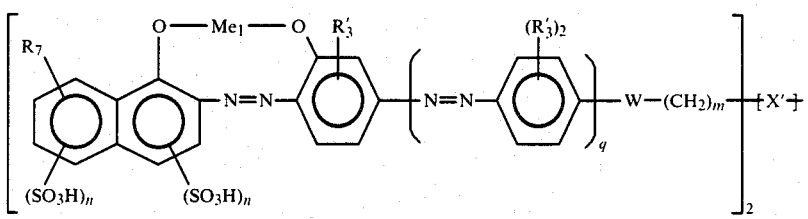

or (ii) an acid addition salt of (i) or (ii), wherein each A' is independently —A$_1'$—NHCO—A$_2'$— or —A$_1'$—CONH—A$_2'$—, wherein A$_1'$ is linear or branched C$_{1-6}$alkylene and is attached to X', and A$_2'$ is 1,3-, 1,4-, 1,5-, 1,6-, 1,7-, 2,6- or 2,7-naphthylene or 1,3- or 1,4-phenylene substituted by 2 R$_{3a}$'s, wherein each R$_{3a}$ is independently hydrogen, halo, hydroxy, C$_{1-6}$alkyl, C$_{1-6}$alkoxy or sulfo, each R$_3'$ is independently hydrogen, hydroxy, methyl, ethyl, chloro, bromo, methoxy or ethoxy, each R$_7$ is independently dimethylamino, diethylamino, trimethylammonium A$^\ominus$, triethylammonium A$^\ominus$ or —NH—Z$_1$, wherein Z$_1$ is as defined below, with the proviso that when an R$_7$ is other than —NH—Z$_1$, it is in the 6-, 7- or 8-position of the ring to which it is attached, each W is independently —NHCO— or —CONH—, X' is

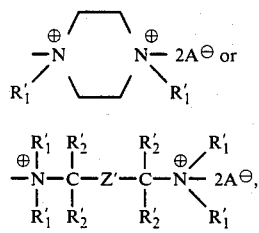

wherein each R$_1'$ is independently C$_{1-4}$alkyl; C$_{1-4}$alkyl substituted by phenyl or C$_{2-4}$alkyl substituted by hydroxy, cyano or halo, and Z' is a direct bond; —O—; —S—; —N(CH$_3$)—; linear or branched C$_{1-10}$alkylene; linear or branched C$_{2-10}$alkylene interrupted by —O—, —S— or —N(CH$_3$)—; linear or branched C$_{2-10}$alkenylene; phenylene; phenylene substituted by 1 or 2 C$_{1-4}$alkyl groups; cyclohexylene; cyclohexylene monosubstituted by C$_{1-4}$alkyl; or

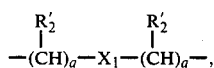

wherein X$_1$ is

—NHCONH—,
—NHCO—(CH$_2$)$_a$—CONH—,

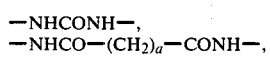
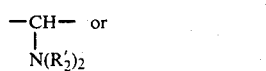

-continued

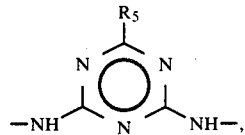

wherein R$_5$ is hydroxy, chloro, —N(R$_6$)$_2$ or methoxy, wherein each R$_6$ is independently hydrogen, C$_{1-4}$alkyl or phenyl, each Me$_1$ independently is copper, chromium, cobalt, iron, nickel or manganese when the complex is a 1:1 metal complex and is chromium, cobalt, iron or nickel when the complex is a 1:2 metal complex, each m is independently 1, 2, 3, 4, 5 or 6, and each n is independently 0 or 1, with the proviso that at least one n on each naphthalene ring is 1,' wherein Z$_1$ is

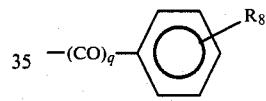

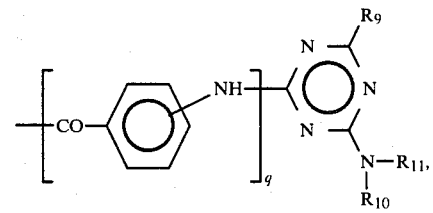

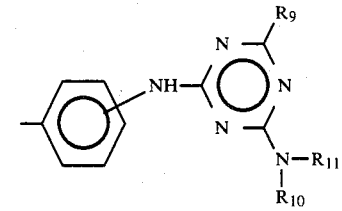

or —Y—R$_{14}$, wherein R$_8$ is dimethylamino, diethylamino, trimethylammonium A$^\ominus$, triethylammonium A$^\ominus$ or —NH—Y—R$_{12}$, wherein R$_{12}$ is —N(R$_{17}$)$_2$ or —N$^\oplus$(R$_{18}$)$_2$R$_{19}$ A$^\ominus$, R$_9$ is chloro, hydroxy, methoxy, amino, N-C$_{1-4}$alkyl-N-C$_{3-4}$alkylamino, N,N-di-(C$_{2-4}$hydroxyalkyl) amino,

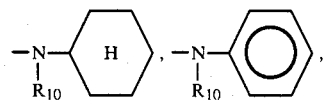

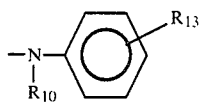

or —NR$_{10}$R$_{11}$, wherein R$_{13}$ is dimethylamino, diethylamino, triemethylammonium A$^{\ominus}$, triethylammonium A$^{\ominus}$, —NH—Y—R$_{12}$, —CONH—Y$_2$—R$_{14}$, —NHCO—Y$_2$—R$_{14}$, —CO—Y$_2$—R$_{14}$, —SO$_2$NH—Y$_2$—R$_{14}$, —Y$_2$—R$_{14}$ or —NHNHCO—CH$_2$—R$_{14}$, wherein R$_{12}$ is as defined above, and R$_{14}$ is as defined below, and R$_{10}$ and R$_{11}$ are as defined below, R$_{10}$ is hydrogen, methyl or ethyl, R$_{11}$ is C$_{1-12}$alkyl; C$_{1-12}$alkyl monosubstituted by hydroxy or methoxy; alkyl having a maximum of 12 carbon atoms interrupted by 1, 2 or 3 radicals independently selected form —NR$_{10}$— and —N$^{\oplus}$(R$_1$)$_2$—A$^{\ominus}$; alkyl having a maximum of 12 carbon atoms monosubstituted by hydroxy or methoxy and interrupted by 1, 2 or 3 radicals independently selected from —NR$_{10}$— and

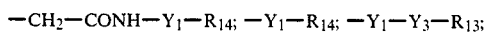

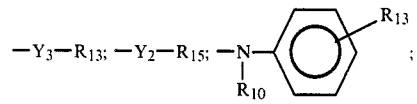

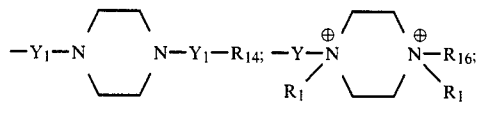

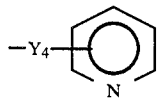

or —CO—Y$_1$—R$_{14}$,
wherein R$_{15}$ is

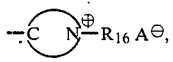

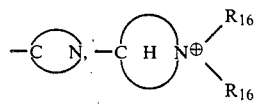

or 

wherein each of

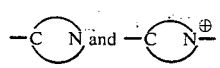

is an unsaturated heterocyclic group,
each of

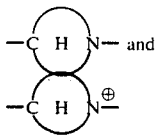

is a saturated heterocyclic group,

R$_{10}$ is as defined above,

Y$_1$ is linear or branched C$_{1-8}$alkylene or linear or branched C$_{3-8}$alkenylene, Y$_3$ is unsubstituted arylene or arylene monosubstituted by one additional R$_{13}$, where R$_{13}$ is as defined above, Y$_4$ is linear or branched C$_{3-8}$alkenylene, each R$_{10}$ independently and R$_{13}$ is as defined above, and R$_{14}$ is as defined below, or —NR$_{10}$R$_{11}$ is

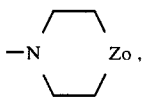

wherein Zo is a direct bond, —CH$_2$—, —O—, —NH—, —NR$_{16a}$— or —N$^{\ominus}$(R$_{16a}$)$_2$—A$^{\ominus}$, wherein each R$_{16a}$ is independently C$_{1-4}$alkyl or C$_{2-4}$alkyl substituted by hydroxy or amino, and R$_{14}$ is

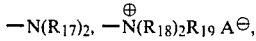

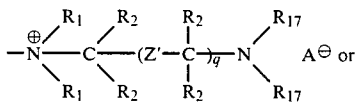

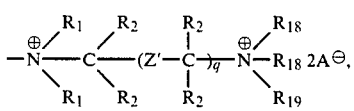

wherein Z' is as defined above, wherein each R$_1$ is independently C$_{1-6}$alkyl; C$_{1-6}$alkyl substituted by 1 to 3 substituents independently selected from halo, cyano, hydroxy and phenyl; C$_{3-6}$alkenyl or C$_{3-6}$alkenyl substituted by 1 to 3 substituents independently selected from halo, cyano, hydroxy and phenyl, each R$_2$ is independently hydrogen; C$_{1-6}$alkyl; C$_{1-6}$alkyl substituted by 1 to 3 substituents independently selected from halo, cyano, hydroxy and phenyl; C$_{3-6}$alkenyl or C$_{3-6}$alkenyl substituted by 1 to 3 substituents independently selected from halo, cyano, hydroxy and phenyl, each R$_2'$ is independently hydrogen, C$_{1-4}$alkyl or C$_{1-4}$alkyl substituted by hydroxy, cyano or halo, each R$_{16}$ is independently C$_{1-4}$alkyl, each R$_{17}$ is independently hydrogen; C$_{1-4}$alkyl; C$_{1-4}$alkyl monosubstituted by carbamoyl; C$_{2-4}$alkyl monosubstituted by hydroxy, halo or cyano; cyclohexyl or cyclohexyl substituted by 1 or 2 methyl groups, or —N(R$_{17}$)$_2$ is morpholino, piperidino, pyrrolidino, pyrrolyl, piperazino or N'-methylpiperazino, each $R_{18}$ is independently $C_{1-4}$alkyl; $C_{1-4}$alkyl monosubstituted by carbamoyl; $C_{2-4}$alkyl monosubstituted by hydroxy, halo or cyano; cyclohexyl or cyclohexyl substituted by 1 or 2 methyl groups, and each $R_{19}$ is independently $C_{1-4}$alkyl; $C_{1-4}$alkyl substituted by (i) phenyl, (ii) phenyl substituted by 1 to 3 substituents independently selected from halo, $C_{1-4}$alkyl and $C_{1-4}$alkoxy, (iii) carbamoyl, (iv) cyano, (v) hydroxy, (vi) chloro, (vii) cyclohexyl or (viii) cyclohexyl substituted by 1 or 2 $C_{1-4}$alkyl groups; allyl or acetylmethyl, or $-N^{\oplus}(R_{18})_2R_{19}$ is pyridinium, pyridinium substituted by 1 or 2 $C_{1-4}$alkyl groups or

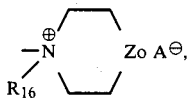

wherein $R_{16}$ and Zo are as defined above, each Y is independently linear or branched $C_{1-6}$alkylene; linear or branched $C_{1-6}$alkylene substituted by hydroxy or $C_{1-4}$alkoxy; *—CO—(CH$_2$)$_m$—; *—NHCO—CH$_2$— or

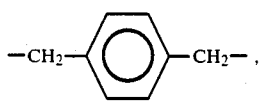

wherein m is 1, 2, 3, 4, 5 or 6, and the * denotes the atom linked to the —NH— radical, each $Y_2$ is independently linear or branched $C_{1-8}$alkylene, each a independently 0, 1, 2, 3, 4, 5 or 6, each q is independently 0 or 1, and each $A^{\ominus}$ is independently a non-chromophoric anion.

3. A metal-free compound according to claim 2 having the formula

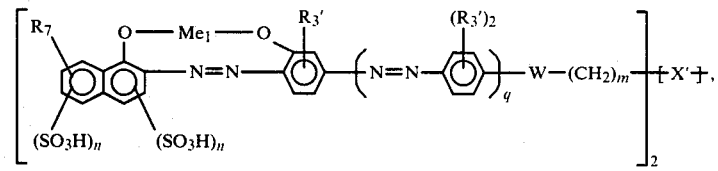

or an acid addition salt thereof.

4. A 1:1 or 1:2 metal complex according to claim 2 having the formula

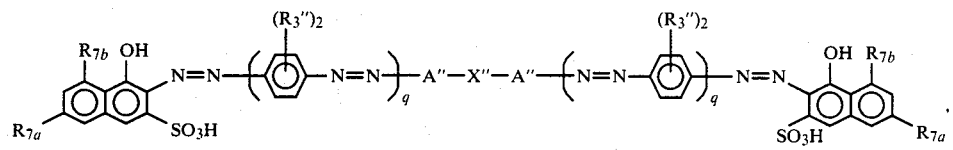

or an acid addition salt thereof.

5. A metal-free compound, a 1:1 or 1:2 metal complex or an acid addition salt according to claim 1 which is (i) a metal-free compound of the formula

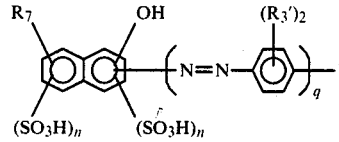 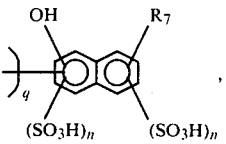

(ii) a 1:1 or 1:2 metal complex of the formula

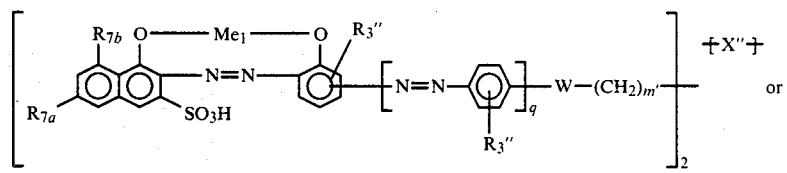

(iii) an acid addition salt of (i) or (ii), wherein each A" is independently

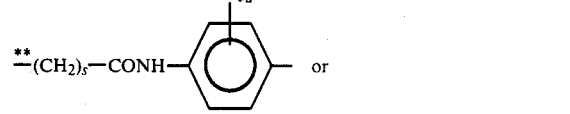

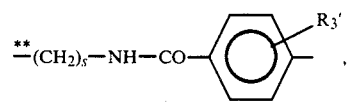

wherein $R_3'$ is hydrogen, hydroxy, methyl, ethyl, chloro, bromo, methoxy or ethoxy, $R_{3a}'$ is hydrogen, hydroxy, methyl, ethyl, chloro, bromo, methoxy, ethoxy or sulfo, s is 1, 2, 3 or 4 and the ** denotes the end attached to X''', each $R_3''$ is independently hydrogen, chloro, bromo, hydroxy, methyl or methoxy, each $R_{7a}$ is sulfo and each $R_{7b}$ is $R_7'$ or each $R_{7a}$ is $R_7'$ and each $R_{7b}$ is hydrogen, where $R_7'$ is dimethylamino, trimethylammonium $A^\ominus$ or $-NH-Z_1'$, wherein $Z_1'$ is as defined below, each W is independently —NHCO— or —CONH—, X'' is

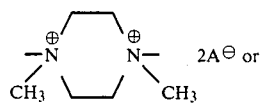

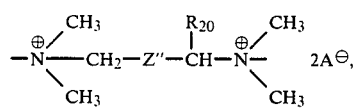

wherein $R_{20}$ is hydrogen or methyl, with the proviso that $R_{20}$ may be methyl only when Z'' is —$CH_2$—, and Z'' is a direct bond, —$(CH_2)_{a_1}$—, —$C(CH_3)_2$—, —CH=CH—, —$CH_2$—$N(CH_3)$—$CH_2$—, 1,4-cyclohexylene, 1,2-phenylene, 1,3-phenylene or 1,4-phenylene, wherein $a_1$ is 1 or 2, each $Me_1$ independently is copper, chromium, cobalt, iron, nickel or manganese when the complex is a 1:1 metal complex and is chromium, cobalt, iron or nickel when the complex is a 1:2 metal complex, and each m' is independently 1, 2, 3 or 4, wherein $Z_1'$ is

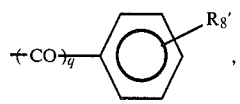

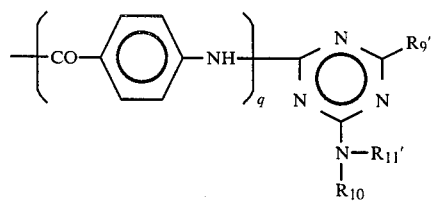

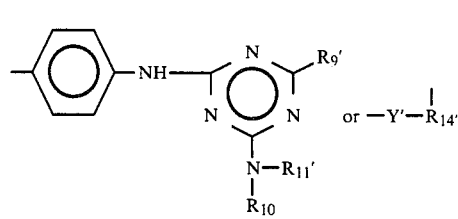

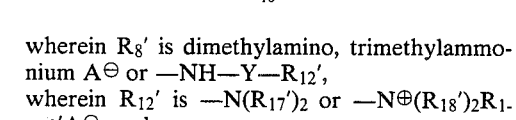

wherein $R_8'$ is dimethylamino, trimethylammonium $A^\ominus$ or $-NH-Y-R_{12}'$, wherein $R_{12}'$ is $-N(R_{17})_2$ or $-N^\oplus(R_{18}')_2R_{19}'A^\ominus$, and Y' is as defined below, $R_9'$ is chloro, hydroxy, amino, $C_{1-2}$alkylamino, $C_{2-4}$hydroxyalkylamino, N,N-di-($C_{2-4}$hydroxyalkyl)amino, $-NR_{10}R_{11}'$ or

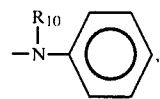

wherein $R_{10}$ and $R_{11}'$ are as defined below, $R_{10}$ is hydrogen, methyl or ethyl, $R_{11}'$ is

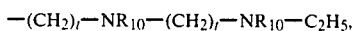

$-(CH_2)_t-NR_{10}-(CH_2)_t-NR_{10}-C_2H_5$, $-((CH_2)_t-\overset{\oplus}{N}(CH_3)_2)_q-(CH_2)_t-\overset{\oplus}{N}(CH_3)_2-C_2H_5A^\ominus$, $A^\ominus$ $-(CH_2)_t-NR_{10}-C_2H_5$, $-NHCO-CH_2-R_{14}'$, $-CH_2-CONH-Y_1'-R_{14}'$, $-Y_1-R_{14}'$, 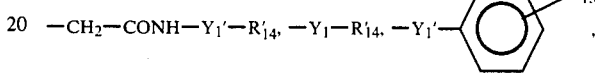

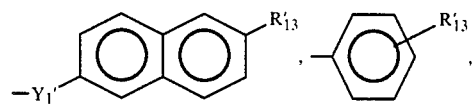

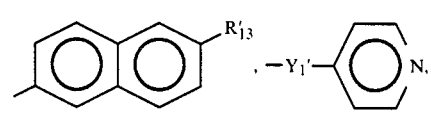

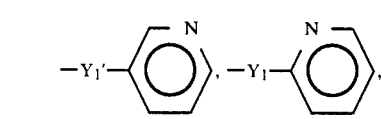

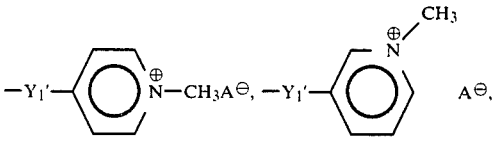

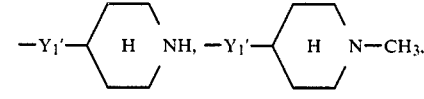

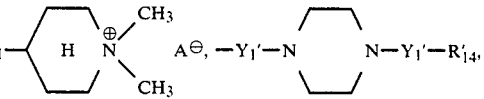

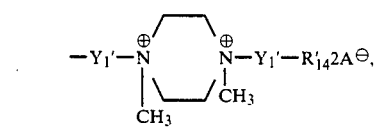

$-NR_{10}-Y_1'-NR_{10}-Y_1'-R_{14}'$, $-Y_1'-NR_{10}-Y_1-R_{14}'$ or $-CO-Y_1'-R_{14}'$, wherein $R_{13}'$ is dimethylamino, trimethylammonium $A^\ominus$, $-CONH-Y_1'-R_{14}'$, $-NHCO-Y_1'-R_{14}'$, $-CO-Y_1'-R_{14}'$, $-SO_2NH-Y_1'-R_{14}'$, $-Y_1'-R_{14}'$ or $-NHNHCO-CH_2-R_{14}'$, wherein $R_{14}'$ is as defined below, $Y_1$ is linear or branched $C_{1-8}$alkylene or linear or branched $C_{3-8}$alkenylene, each $Y_1'$ is independently linear or branched $C_{1-4}$alkylene, $R_{10}$ is as defined above, and $R_{14}'$ is as defined below, or $-NR_{10}R_{11}'$ is

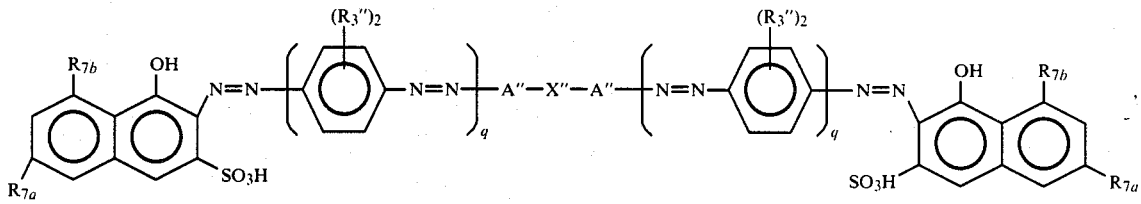

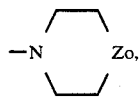

wherein $Zo$ is a direct bond, $-CH_2-$, $-O-$, $-NH-$, $-NR_{16a}-$ or $-N^\ominus(R_{16a})_2-A^\ominus$, wherein each $R_{16a}$ is independently $C_{1-4}$alkyl or $C_{2-4}$alkyl substituted by amino or hydroxy, $R_{14}'$ is $-N(R_{17}')_2$, $-N^\oplus(R_{18}')_2R_{19}'A^\ominus$, $-N^\beta(CH_3)_2-CH_2-Z''-CHR_{20}-N(R_{17}')_2A^\ominus$ or $-N^\oplus(CH_3)_2-CH_2-Z''-CHR_{20}-N^\oplus(R_{18}')_2R_{19}'2A^\ominus$, wherein each $R_{20}$ and $Z''$ are as defined above, and $Y'$ is $*-CO-CH_2-$ or $-(CH_2)_t-$, wherein the * denotes the atom linked to the $-NH-$ radical, wherein each $R_{17}'$ is independently hydrogen, methyl, ethyl, cyclohexyl, cyanoethyl, hydroxyethyl or chloroethyl or $-N(R_{17}')_2$ is morpholino, piperidino, pyrrolidino, pyrrolyl, piperazino or N'-methylpiperazino, each $R_{18}'$ is independently methyl, ethyl, cyclohexyl, cyanoethyl, hydroxyethyl or chloroethyl, each $R_{19}'$ is independently methyl, ethyl, cyanoethyl, hydroxyethyl, chloroethyl, benzyl, allyl, acetylmethyl or carbamoylmethyl, or $-N(R_{18}')_2R_{19}'$ is pyridinium, α-picolinium, β-picolinium, dimethylpyridinium or

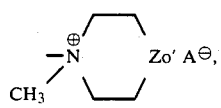

wherein $Zo'$ is a direct bond, $-CH_2-$, $-O-$, $-NH-$, $-N(CH_3)-$ or $-N^\oplus(CH_3)_2-A^\ominus$, each $q$ is independently 0 or 1, each $t$ is independently 2 or 3, and each $A^\ominus$ is independently a non-chromophoric anion.

6. A metal-free compound according to claim 5 having the formula

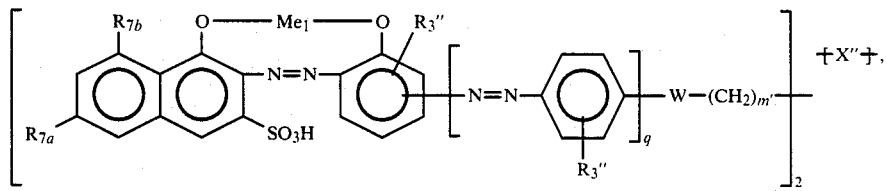

or an acid addition salt thereof.

7. A 1:1 or 1:2 metal complex according to claim 5 having the formula

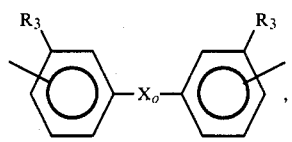

or an acid addition salt thereof.

8. A metal-free compound, 1:1 or 1:2 metal complex or acid addition salt according to claim 1 wherein $A_1$ is linear or branched $C_{1-8}$alkylene and is attached to X, $A_2$ is phenylene; phenylene substituted by 1 to 3 substituents independently selected from halo, hydroxy, $C_{1-6}$alkyl, $C_{1-6}$alkoxy and sulfo; naphthylene or

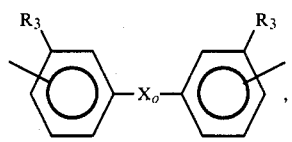

wherein $X_o$ is a direct bond or linear or branched $C_{1-4}$alkylene, and $R_3$ is as defined below, each $R_1$ is independently $C_{1-6}$alkyl; $C_{1-6}$alkyl substituted by halo, cyano, hydroxy or phenyl; or $C_{3-6}$alkenyl, each $R_2$ is independently hydrogen; $C_{1-6}$alkyl; $C_{1-6}$alkyl substituted by hydroxy, cyano or halo; or $C_{3-6}$alkenyl, and each $R_3$ is independently hydrogen, halo, hydroxy, $C_{1-6}$alkyl or $C_{1-6}$alkoxy.

9. The metal-free compound according to claim 8 having the formula

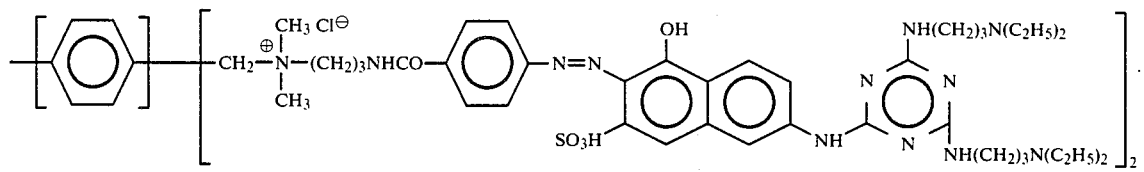

10. The metal-free compound according to claim 8 having the formula

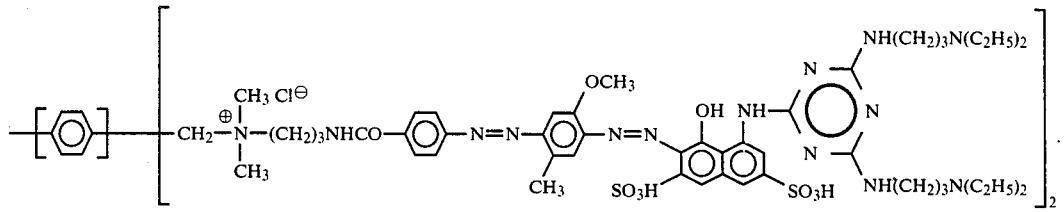

11. The metal-free compound according to claim 8 having the formula

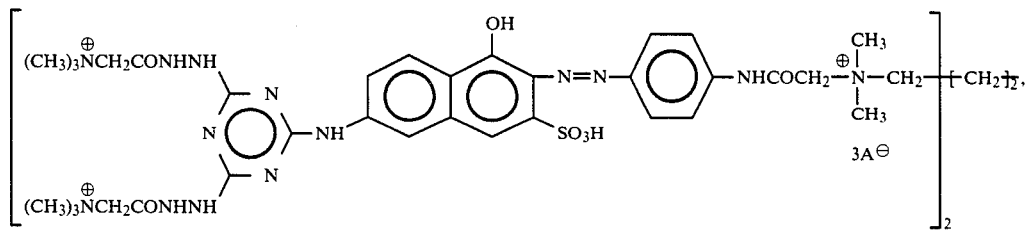

wherein each $A^\ominus$ is a non-chromophoric anion.

13. A metal-free compound according to claim 8 having the formula

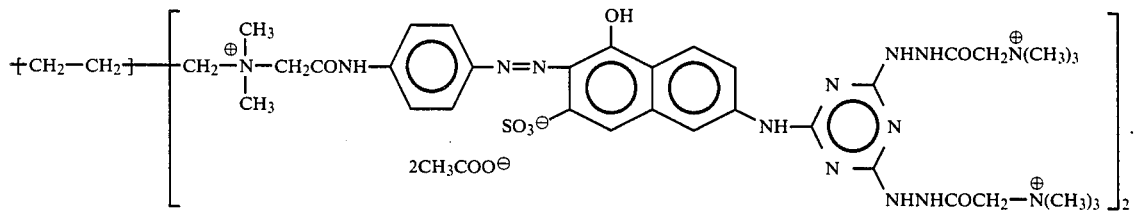

wherein each $A^\ominus$ is a non-chromophoric anion.

12. A metal-free compound according to claim 8 having the formula

14. The 1:1 metal complex according to claim 8 having the formula